(12) United States Patent
Shuman et al.

(10) Patent No.: US 9,094,519 B1
(45) Date of Patent: Jul. 28, 2015

(54) ENHANCING REACHABILITY IN INTERNET PROTOCOL COMMUNICATIONS

(71) Applicant: QUALCOMM Incorporated, San Diego, CA (US)

(72) Inventors: Mohammed Ataur Rahman Shuman, San Diego, CA (US); Amit Goel, San Diego, CA (US); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/179,603

(22) Filed: Feb. 13, 2014

(51) Int. Cl.
*H04M 3/42* (2006.01)
*H04W 36/00* (2009.01)
*H04M 3/54* (2006.01)

(52) U.S. Cl.
CPC ........................................ *H04M 3/54* (2013.01)

(58) Field of Classification Search
CPC ............ H04M 3/54; H04M 3/58; H04M 3/46
USPC ............. 379/211.02, 201.01, 201.07, 207.13, 379/212.01; 455/436
See application file for complete search history.

(56) References Cited

U.S. PATENT DOCUMENTS 6,771,761 B1 * 8/2004 LaPierre .................. 379/211.02
8,477,691 B2 * 7/2013 Bohacek et al. .............. 370/328
2005/0031094 A1 * 2/2005 Gilbert ....................... 379/88.14
2007/0250322 A1 10/2007 Runge et al.
2011/0293084 A1 12/2011 Bhagavatula et al.
2012/0099719 A1 4/2012 Erb
2013/0210393 A1 8/2013 Hillier
2013/0252570 A1 * 9/2013 Kostadinov et al. ........ 455/404.1

FOREIGN PATENT DOCUMENTS

EP 2043347 A1 4/2009
WO 2013062703 A1 5/2013

OTHER PUBLICATIONS

International Search Report and Written Opinion—PCT/US2015/015953—ISA/EPO—May 5, 2015.

\* cited by examiner

*Primary Examiner* — Thjuan K Addy
(74) *Attorney, Agent, or Firm* — The Marbury Law Group, PLLC

(57) ABSTRACT

Methods, devices, and systems enable a server to route a communication from a calling party to a third-party device when a called party is unreachable by obtaining current status data from a plurality of devices registered with the server, and generating a list of potential third-party devices based at least on the obtained current status data. A call request notification may be transmitted to a third-party device selected from the list. In response to receiving a call acceptance message, the server may transmit an authentication challenge for the called party. The server may determine whether an authentication response message includes a correct response to the authentication challenge, and if so, administer the communication between a calling party device and the selected third-party device. The server may calculate charges to the calling party or called party and credits for the third-party whose device accepts the communication for the called party.

30 Claims, 15 Drawing Sheets

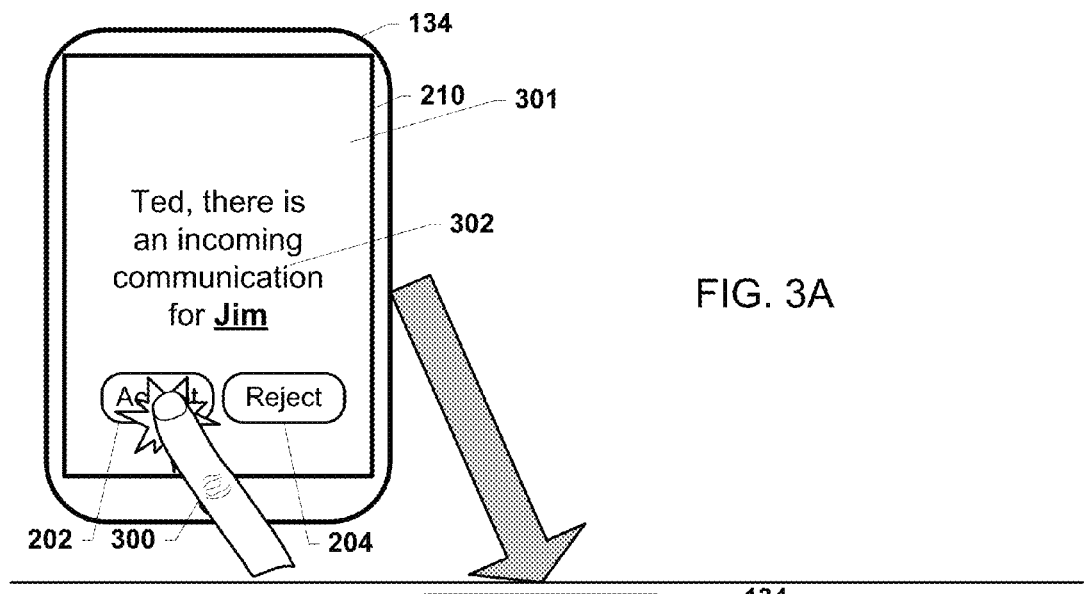
FIG. 3A
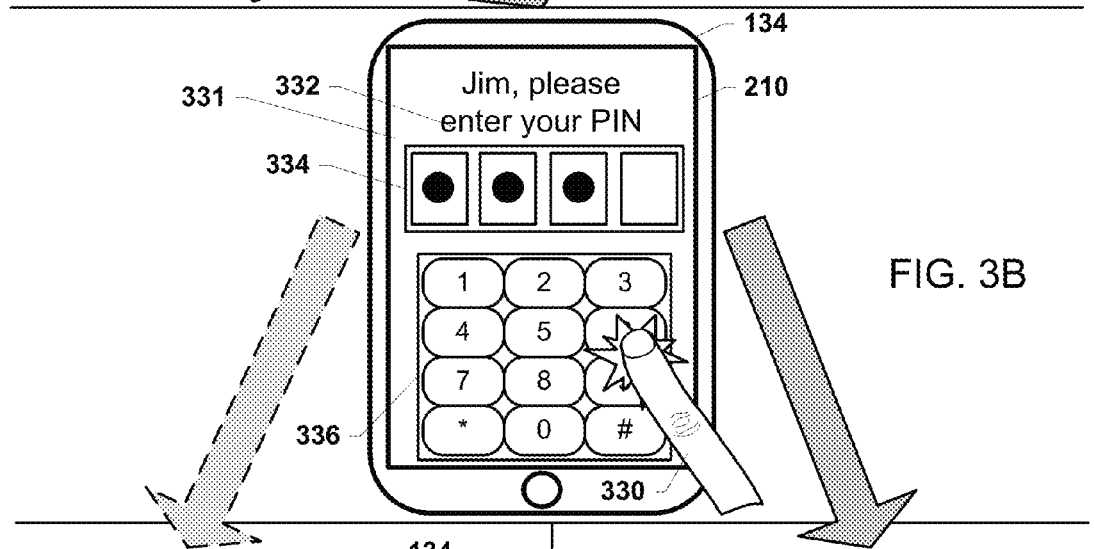
FIG. 3B
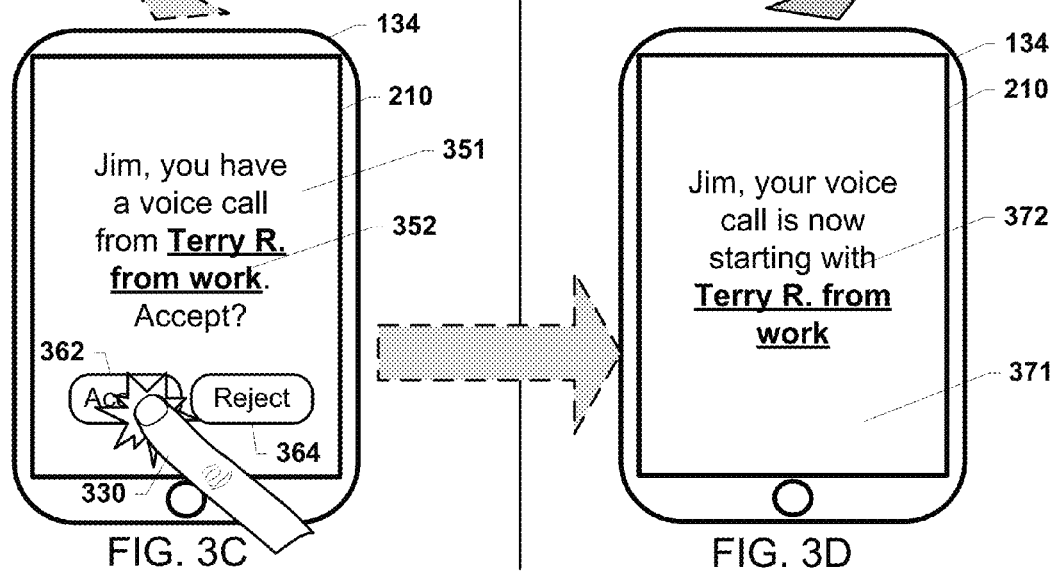
FIG. 3C
FIG. 3D

ENHANCING REACHABILITY IN INTERNET PROTOCOL COMMUNICATIONS

BACKGROUND

Telephone calls are often not answered, with calling parties being directed to the voice mail of a called party or simply receiving no answer. Calls may not be answered for various reasons, such as failure of the called party to see a notification of an incoming call (e.g., phone in a pocket, ringer turned off, etc.), the called party being busy on another call, and the called party's phone being unavailable (e.g., dead battery, no service, VOIP application not running, etc.). One solution to contacting unreachable called parties is traditional call forwarding that forwards calls to another number or numbers defined by a user (i.e., according to user-defined rules for forwarding incoming calls). However, call forwarding requires a user to program a system to utilize predefined, static lists of numbers, which is not the most effective or context-appropriate solution.

SUMMARY

Various embodiments provide systems, methods, devices, and non-transitory processor-readable storage media for routing a communication associated with a communication service from a calling party to a computing device of a third-party when a called party is unreachable at his/her computing device. An embodiment method may include obtaining current status data from a plurality of computing devices for storage within profiles of registered users of the communication service, the registered users including at least the calling party, the called party, and the plurality of third-parties, determining whether the called party is unreachable based on an unanswered call request for the communication from a calling party computing device, generating an ordered list of potential third-party computing devices associated with the plurality of third-parties based on the unanswered call request for the communication, the profiles of the registered users, and the obtained current status data in response to determining the called party is unreachable on his/her own device, selecting a third-party computing device from the ordered list of potential third-party computing devices, transmitting a call request notification to the selected third-party computing device, determining whether a call acceptance message is received from the selected third-party computing device, transmitting an authentication challenge for the called party to answer to the selected third-party computing device in response to receiving the call acceptance message from the selected third-party computing device, determining from an authentication answer message received from the selected third-party computing device whether the called party correctly answered the transmitted authentication challenge, and administering the communication between the calling party computing device and the selected third-party computing device in response to determining that the called party correctly answered the authentication challenge.

In an embodiment, the obtained current status data may include obtaining at least one of computing device location information, scheduling information, and computing device registration information. In an embodiment, transmitting the call request notification to the selected third-party computing device may include generating, based on the unanswered call request and the profiles of the registered users, the call request notification with presentation information that includes at least an identification of the called party.

In an embodiment, the authentication challenge for the called party may be a prompt for at least one of a personal identity number (PIN), a biometric fingerprint scan, a spoken keyword, an iris scan, and an NFC tap. In an embodiment, the method may also include determining from the authentication answer message whether the called party correctly answered the authentication challenge but does not accept the communication, transmitting, to the selected third-party computing device, complete presentation information related to the unanswered call request that indicates at least an identification of the calling party in response to determining that the called party correctly answered the authentication challenge but does not accept the communication, and determining whether a message is received from the selected third-party computing device that accepts the communication after transmission of the complete presentation information related to the unanswered call request, in which administering the communication between the calling party computing device and the selected third-party computing device in response to determining that the called party correctly answered the authentication challenge may include administering the communication between the calling party computing device and the selected third-party computing device in response to determining the called party has correctly answered the authentication challenge and that the message is received that accepts the communication.

In an embodiment, the method may also include transmitting a representation of the ordered list of potential third-party computing devices to the calling party computing device, receiving an approval response message in response to transmitting the representation from the calling party computing device, and revising the ordered list of potential third-party computing devices based on the received approval response message by at least one of reordering the ordered list of potential third-party computing devices and removing items from the ordered list of potential third-party computing devices, and selecting the third-party computing device from the ordered list of potential third-party computing devices may include selecting the third-party computing device from the revised list of potential third-party computing devices.

In an embodiment, the method may also include operations for calculating at least one of billing information and crediting information based on the administered communication. In an embodiment, the method may also include selecting another third-party computing device from the ordered list of potential third-party computing devices, and transmitting the call request notification to the selected another third-party computing device in response to determining that the call acceptance message was not received from the selected third-party computing device.

Further embodiments include a server computing device configured with server-executable instructions to perform server operations of the methods described above. Further embodiments include a non-transitory server-readable medium on which are stored server-executable instructions configured to cause a server computing device to perform operations of the methods described above. Further embodiments include a communication system including a telecommunication network, a server computing device coupled to the network, and a plurality of computing devices communicating via the telecommunication network, in which the server computing device and the plurality of computing devices are configured with executable instructions to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 3A-3D are diagrams illustrating an exemplary sequence of displays of information presented on a third-party computing device in response to receiving user inputs related to a call request notification associated with a communication service suitable for use with various embodiments.

DETAILED DESCRIPTION

Figure 1A:
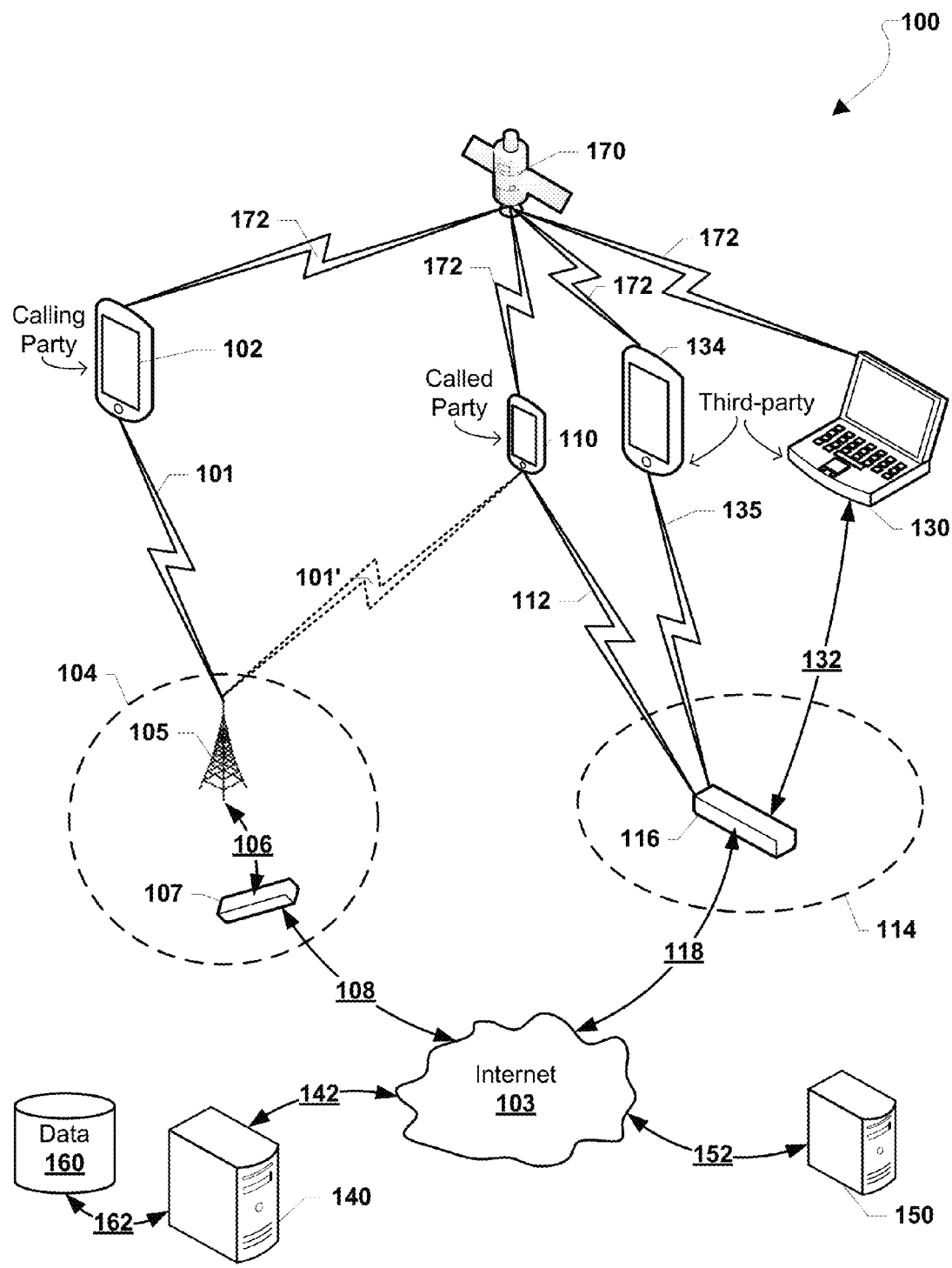
FIG. 1A is communication system diagram illustrating network components suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to any one or all of cellular telephones, smartphones (e.g., iPhone), web-pads, tablet computers, Internet enabled cellular or mobile telephones, Wi-Fi enabled electronic computing devices, personal data assistants (PDA's), laptop computers, personal computers, and similar electronic devices equipped with at least a processor. In various embodiments, such computing devices may be configured with a network transceiver (or other network interface) to establish a wide area network (WAN) or local area network (LAN) connection (e.g., an LTE, 3G or 4G wireless wide area network transceiver, a wired connection to the Internet, or Wi-Fi).

The terms "server" and "server computing device" are used to refer to any computing device capable of functioning as a server, such as a master exchange server, web server, mail server, document server, and a personal or mobile device configured with software to execute server functions (e.g., a "light server"). A server computing device may be a dedicated computing device or a computing device including a server module (e.g., running an application which may cause the computing device to operate as a server). A server module (or server application) may be a full function server module, or a light or secondary server module (e.g., light or secondary server application) that is configured to provide synchronization services among the dynamic databases on computing devices. A light server computing device or secondary server computing device may be a slimmed-down version of server type functionality that can be implemented on a personal or mobile computing device, such as a smart phone, thereby enabling it to function as an Internet server (e.g., an enterprise e-mail server) to a limited extent, such as necessary to provide the functionality described herein.

The term "communication service" is used herein to refer to any service for establishing and processing communications (e.g., calls) between computing devices. A communication service may utilize Internet protocol (IP), push-to-talk (PTT), or other similar messaging formats or technologies to enable communications between users. For example, a communication service may provide voice-over Internet protocols (VOIP) communications for its registered users to conduct media rich calls (e.g., video chats, voice calls, etc.). A communication service may require a central computing device, such as a server computing device, to establish, maintain, and process communications between computing devices of registered users. In particular, a server computing device associated with a communication service may perform operations to route and connect communications between computing devices (e.g., smartphones), as well as maintain user profiles and process billing and/or crediting data related to usage of the communication service by registered users. Further, a communication service may be associated with software, an application (or app), or other functionality that may be executed on computing devices of registered users. For example, a first computing device may transmit signals via a VOIP application in order to cause a server computing device associated with the VOIP service to establish a VOIP call with a second computing device. It should be appreciated that any reference within this disclosure to a telecommunication network or other network used to conduct such a communication service may include communications using various IP communication network interfaces, such as wireless local area network (WLAN) or Wi-Fi.

The term "calling party" is used herein to refer to a user of a computing device that initiates or requests a communication via a communication service. The term "called party" is used herein to refer to a user of a computing device who is the intended recipient of a communication via a communication service that is initiated or requested by a calling party. The term "call request" is used herein to refer to a signal or other message that requests the establishment of a communication between the devices of the calling party and called party. The term "third-party" is used herein to refer to a user of a computing device who is neither a calling party nor a called party for a particular communication. In various embodiments, a calling party, a called party, and a third-party may be registered to utilize a communication service with their respective computing devices. Accordingly, it should be appreciated that any registered user of a communication service may be a calling party, a called party, and/or a third-party based on his/her relation to an individual communication via the communication service.

The various embodiments provide methods, devices, systems, and non-transitory process-readable storage media for a server computing device associated with a communication service to route (or re-route) a communication to a dynamically generated or compiled third-party computing device when a called party is unreachable via his/her own computing device. When a called party does not accept a call request from a calling party (i.e., a call request goes unanswered), the server computing device may identify a third-party computing device that is relevant, known, or otherwise appropriate for forwarding the communication based on data within stored profiles of the called party, the calling party, and the other users of the communication service. For example, the server computing device may dynamically identify a smartphone as most appropriate for receiving a re-routed voice call based on a current location and relationship to the called party. The server computing device may transmit a call request notification that includes information authorized to be shared when establishing a communication (e.g., voice call) with the called party via the third-party computing device. For example, the server computing device may or may not share the identity of the calling party within the call request notification. In response to receiving an acceptance of a communication based on a call request notification, the server computing device may transmit an authentication challenge (e.g., a PIN prompt) to confirm the identity of the called party. If the called party is authenticated at the identified third-party computing device the server computing device may establish the communication and/or share sensitive information. Thus, the various embodiment techniques may improve the "reachability" of called parties using signaling mechanisms that protect the privacy of parties without requiring static, predefined forwarding information for re-routing missed communications.

The server computing device may be configured to receive, store, and evaluate current data from devices of the registered users of the communication service. Such current data (or current status data) may indicate the current activity, context, and operating conditions of a user and/or his/her computing devices configured to utilize the communication service. For example, status data for a registered user may include location information (e.g., GPS coordinates, etc.), schedule information (e.g., calendar data, meeting agendas, etc.), computing device registration information (e.g., IP address, service set identifier or 'SSID', etc.), sensor data, and other data that may be stored in relation to the registered user. Current status data may be transmitted to the server computing device via signals from various devices of registered users based on a periodic or scheduled basis (e.g., every few minutes, hours, days, etc.) or alternatively in response to encountered events (e.g., a smartphone switching from one cellular network access point to another, etc.).

The server computing device may be configured to evaluate current status data to identify devices (referred to as "potential third-party computing devices") that may be used to re-route call requests for a registered user who is currently unreachable at his/her own computing device. For example, the server computing device may evaluate the current location of all registered users' smartphones to determine the devices that are nearby a called party who is not accepting a call request for a video chat. As another example, the server computing device may evaluate the current scheduled meeting times for a first user to determine whether the first user's device may be free to be used to accept an incoming call for a second user. In an embodiment, the server computing device may only identify potential third-party computing devices that have "opted-in" to receiving re-routed communications for other users. For example, the server computing device may only identify a first user's smartphone as being a possible recipient of a second user's IP call when the first user has set a participation flag in his profile stored by the server computing device. Similarly, the server computing device may only be configured to perform re-routing operations when the calling party and called party have also agreed to have their communications re-routed to third-party computing devices.

In various embodiments, the server computing device may use rules (or "smart rules") defined by users and stored within their respective profiles to automatically identify and/or order potential third-party computing devices to receive a call request notification. For example, a called party may have predefined associations between contexts (e.g., location, schedule/meeting information) and the relationships with other registered users, the called party, and/or the calling party to determine the priority, rank, or other order of all appropriate computing devices to receive re-routed calls for the called party. As another example, the server computing device may store profile data for a called party that prioritizes a spouse's smartphone over a colleague's smartphone when the called party missed an incoming call and both the spouse and colleague are determined to be near the called party.

The server computing device may evaluate other information within user profiles to determine the order of potential third-party computing devices, such as the activity state (e.g., sensor data indicating movement, etc.), the content of the communication (e.g., includes work documents, sensitive materials, etc.) and/or the identity of the parties (e.g., the boss is calling, only acquaintances are nearby the called party, etc.).

The server computing device may transmit different information to be presented on third-party computing devices based on stored profile data. In particular, the server computing device may format a call request notification to a third-party computing device to include vague or otherwise abstracted information to avoid disclosing identifying information of a calling party when not authorized by either the called party or the calling party. For example, call request notifications may only identify called parties without indicating the nature of the incoming communication, the calling party, and/or the type of call media (e.g., video, voice only, etc.). Such formatting may provide content protection and privacy of both the calling party and the called party.

In another embodiment, the server computing device may transmit information to a calling party device indicating potential third-party computing devices. For example, based on privacy settings or preferences within the profile of a first user of a potential third-party computing device, the server computing device may transmit only the type of device without the identity of the first user to a calling party prior to transmitting a call request notification. Such information of potential third-party computing devices may be approved, adjusted, or rejected by a calling party prior to the server computing device transmitting call request notifications and re-routing a communication. In other words, the server computing device may receive from a calling party computing device an approval response message including a re-ordered or even shortened list of potential third-party computing devices for a communication. For example, a calling party may not desire to have a call re-routed to any device not owned by the called party, and so may transmit an empty approval response message that is received by the server computing device. As another example, based on user inputs, a calling party computing device may transmit an approval response message to the server computing device that switches the order of a first and a second smartphone to potentially receive a call request notification.

In various embodiments, the called party and/or a third-party using a third-party computing device may accept or reject a communication in response to receiving a call request notification. For example, a smartphone may transmit a reject message in response to the called party pressing a "reject" graphical user interface button corresponding to a certain call request notification.

In another embodiment, a called party may receive on a third-party computing device complete information (or more complete information) regarding a call request, such as the calling party identity, in response to providing a correct authentication challenge answer. For example, before a call is initiated between a calling party and a called party on a third-party computing device, the server computing device may transmit the calling party identification and the topic of the call to the called party at the third-party computing device. In an embodiment, an authentication challenge (e.g., a PIN prompt) may be answered by a called party on a third-party computing device before accepting a communication. For example, when an authentication challenge is transmitted within an initial call request notification by the server computing device, the receiving third-party computing device may receive and transmit a personal identifier number (PIN) answer before sending a signal accepting the call. In this way, the identity of the calling party (and other sensitive information) can be protected before the called party is authenticated, and the called party may still be enabled to choose to avoid the communication having a full understanding of its participants, context, etc.

In an embodiment, the server computing device may be configured to compensate or reimburse third-party individuals who permit their computing devices to receive forwarded communications. In this embodiment, the server computing device may be configured to calculate billing information, such as charges, fees, and other information related to a communication that has been re-routed, and determine amounts of money, time, and/or other valuable currency to deduct or charge to accounts of the called party and/or the calling party, and/or credited to the third party based on a use of the third-party's computing device to complete a re-routed communication. For example, a called party may be retroactively charged an amount of money or network access time in the same amount or manner charged to a cellular network account of a third-party smartphone the called party used to accept a re-routed video call. Similarly, the server computing device may be configured to calculate credit information, such as awards, credits, and other incentives to provide to third-party individuals who have permitted their computing devices to receive a communication intended for a called party who is unreachable via his/her own device. For example, the server computing device may credit an Internet access or other account associated with a third-party individual who has opted-into a program and received another called party's incoming call. In an embodiment, the server computing device may calculate billing/crediting information or otherwise assign bills, charges, fees, or credits to participating parties only when a re-routed communication has been successfully accepted at a third-party computing device (e.g., no charges when the called party refuses to accept a call request, when the third-party rejects a call request, when there is no response at the third-party computing device, etc.).

In an embodiment, the server computing device may forward documents (e.g., email, text messages, etc.) instead of calls, and may format payloads based on the context, authorizations within relevant profiles, and other factors. In particular, when a communication being re-routed to a third-party computing device includes sensitive materials (e.g., confidential data), the server computing device may encode and password-protect the data to ensure only the called party can access the materials, such as by requiring a PIN before the payload can be viewed. In another embodiment, re-routed communications and related data may be deleted from third-party computing devices using auto-expire policies (e.g., time-to-live or 'TTL' associated with the calls), user inputs, and/or contexts related to the communications (e.g., location, time, facial recognition of computing device user, etc.).

Lawful intercept of communications may be enabled with the various embodiments. In particular, when a law enforcement agency legally requests to intercept communications for a certain called party (i.e., the called party is the subject of an intercept), the server computing device may be configured to begin intercepting, filtering, storing, or performing other operations on the data of a communication once the called party is authenticated and answered the communication on a third-party device. For example, the server computing device may begin lawful interception of voice data when the subject of the interception is identified based on an entered PIN on a third-party's smartphone. Lawful tracing (or locating) may also be enabled based on location information (e.g., GPS coordinates) of third-party computing devices that receive calls for authenticated called parties. By ensuring a called party is authenticated prior to receiving a call, the embodiment techniques may be used to serve the purpose of lawful intercepts without violating the privacy of third-parties.

The various embodiments differs from conventional call forwarding that simply re-direct communications to static, predefined destinations, because the various embodiment techniques use automatically generated lists of potential third-party computing devices that dynamically change based on at least the current conditions of the called party (and her/his device) as well as the conditions of potential third-party computing devices. Based on information within profiles of registered users of a common communication service, the embodiment techniques may re-route communications to the best third-party computing device at a given time, such as a smartphone that is closest in distance, without necessarily using any predetermined destination device. Further, the embodiment techniques may utilize real-time signaling between the called party device, the server computing device, and a third-party computing device to protect secure information and privacy of the parties, ensuring that authorized information may only be transmitted to authenticated parties at the time of a communication setup. Conventional call forwarding and similar techniques do not provide these advantages.

For the purpose of simplicity, the embodiments may be described as relating to "calls," such as voice calls, video calls, or video chats from a calling party to a called party. However, it should be appreciated that such references to a particular type of communication are for example purposes only, and that the embodiments are not intended to be limited to any one form of communication type or format because the embodiment methods have equal applicability and utility for other forms of communication, including video calls, notifications, rich multimedia communications, push-to-talk calls, voice-over IP (VOIP) calls, multi-party conference calls (e.g., a group communication session), text messages, media messages, and email.

FIG. 1A illustrates an exemplary communication system 100 that may be used in the various embodiments. The communication system 100 may include a server computing device 140 configured to process and maintain communications associated with a communication service, such as Internet protocol (IP) (e.g., VOIP) and/or push-to-talk (PTT) communication services. For example, the server computing device 140 may be a server computing device that receives and relays two-way messaging between computing devices participating in a video or voice chat (or other form of communication). The server computing device 140 may transmit and receive various signals, messages, and other communications over the Internet 103 via a wired or wireless connection 142.

The server computing device 140 may also include a plurality of components, blades, or other modules to process and store data associated with the communication service. In an embodiment, the server computing device 140 may be configured to utilize various storage devices, such as a database unit 160 in communication with the server computing device 140 via a wired or wireless connection 162. For example, the server computing device 140 may transmit usage information of computing devices registered with the communication service (e.g., aggregated data and/or heuristics information, statistics of connected calls via the communication service, etc.) to the database unit 160 for storage. In an embodiment, the database unit 160 may be a component within the server computing device 140.

The server computing device 140 may store locally and/or within the database unit 160 various data related to the registered users of the communication service, in particular within profiles (or user profiles). Stored profiles may include status data of users' devices and/or the users themselves, such as location information (e.g., GPS coordinates), computing device registration information, scheduling information (e.g., calendar data), IP addresses, service set identifiers (SSID), and sensor data (e.g., accelerometer sensor data, etc.). Status data may be obtained by the server computing device 140 from various computing devices on a periodic basis (e.g., every few seconds, minutes, days, weeks, etc.). User profiles may also include other information relevant to the registered users of the communication service, such as user names, authentication information (e.g., PINs, passwords, etc.), contact information (e.g., email addresses, phone numbers, etc.), and information describing associated computing devices (e.g., computing device type). Further, user profiles may include user-defined rules that may control the distribution of information corresponding to calls (or call requests) as well as the process by which third-parties (or third-party computing devices) that may be used for call re-routing purposes are identified and compiled into an ordered list. For example, a user profile may include rules, guidelines, or other logic that may be used by the server computing device 140 when generating information that may be transmitted for presentation by a calling party computing device, called party computing device, and/or third-party computing device in association with a call request.

In an embodiment, the communication system 100 may also include a remote server computing device 150, such as an exchange server or other computing device configured to maintain information related to web sites, social networking services, and other Internet-accessible information. For example, the remote server computing device 150 may be associated with social media (or social networking) websites, email services, and/or cloud computing/storage services. The remote server computing device 150 may communicate with other computing devices, such as the server computing device 140, over the Internet 103 via a wired or wireless connection 152. For example, in response to receiving a request message, the remote server computing device 150 may transmit to the server computing device 140 locally-stored activity information (e.g., location information, social media status update messages, IP address, etc.) related to registered users of the communication service associated with the server computing device 140.

The communication system 100 may also include various computing devices (e.g., smartphones, laptops, etc.) configured to participate in Internet protocol communications and associated with users registered with the communication service. In particular, the communication system 100 may include a first computing device 102, a second computing device 110, a third computing device 134, and a fourth computing device 130. The first computing device 102 may be associated with a calling party (i.e., a registered user of the communication service that initiates a call), the second computing device 110 may be associated with a called party (i.e., a registered user who is the intended recipient of a call initiated by the calling party), and the third and fourth computing devices 130, 134 may be associated with third-parties (i.e., registered users who are neither the calling party nor the called party). The computing devices 102, 110, 130, 134 may include processors configured to execute software, applications, instructions, and/or routines associated with the server computing device 140 and the communication service. For example, the computing devices 102, 110, 130, 134 may be configured to execute an application for video chatting via IP communications or for exchanging PTT communications.

The computing devices 102, 110, 130, 134 may also utilize various transceivers and antennas to transmit and/or receive wireless signals. In particular, the first computing device 102 may be configured to exchange long-range wireless signals 101 with a cellular tower 105 (or base station) associated with a cellular network 104 (e.g., a 3G, 4G, LTE cellular wide area network (WAN)). The cellular network 104 may include various computing devices, such as a network operations center 107 coupled to the cellular tower 105 by a wired or wireless connection 106. The network operations center 107 may manage voice calls and data traffic through the cellular network 104, and typically may include or may be connected to one or more server computing devices (not shown). The cellular network 104 may provide a connection 108 to the Internet 103. In various embodiments, any or all of the computing devices 102, 110, 130, 134 may be configured to communicate with wide area networks, such as the cellular network 104, by exchanging signals with nearby base stations, such as the cellular tower 105. For example, the second computing device 110 may also be configured to exchange long-range wireless signals 101' with the cellular tower 105 to communicate with other computing devices via the Internet 103.

In an embodiment, the computing devices 102, 110, 130, 134 may also include components for use with location or positioning services or systems, such as a global positioning system (GPS). For example, any or all of the computing devices 102, 110, 130, 134 may include a GPS transceiver/radio configured to receive signals 172 from a GPS satellite 170 in orbit overhead. As another example, the computing devices 102, 110, 130, 134 may obtain location information (e.g., GPS coordinates, etc.) from assisted-GPS (AGPS) techniques. In various embodiments, any or all of the computing devices 102, 110, 130, 134 may be configured to obtain location information or other geographical positioning information from other services that may not utilize GPS techniques, such as a location service provided by a remote computing device accessible via the Internet 103.

The second computing device 110, the third computing device 134, and the fourth computing device 130 may be within the same area, such as within the same room, building, restaurant, etc. For example, the second computing device 110, the third computing device 134, and the fourth computing device 130 may belong to co-workers currently within the same meeting room, random strangers within the same restaurant, family members within the same house, etc. As described below, the server computing device 140 may utilize obtained current status data, such as location information (e.g., GPS coordinates) from the computing devices 110, 134, 130 to determine whether these computing devices 110, 134, 130 are within the same area and/or within proximity of one another. When within the same area, these computing devices 110, 134, 130 may utilize wired or wireless connections 112, 135, 132 with a router 116 (e.g., a Wi-Fi router) within a local area network 114, such as a Wi-Fi local area network (LAN). The local area network 114 may provide a connection 118 to the Internet 103. In an embodiment, the local area network 114 may include an Internet access server computing device (not shown) connected to the router 116. In an embodiment, if within the same area (e.g., office building, etc.), the first computing device 102 may also communicate with the local area network 114 via wireless signals (not shown) to the router 116.

Figure 1B:
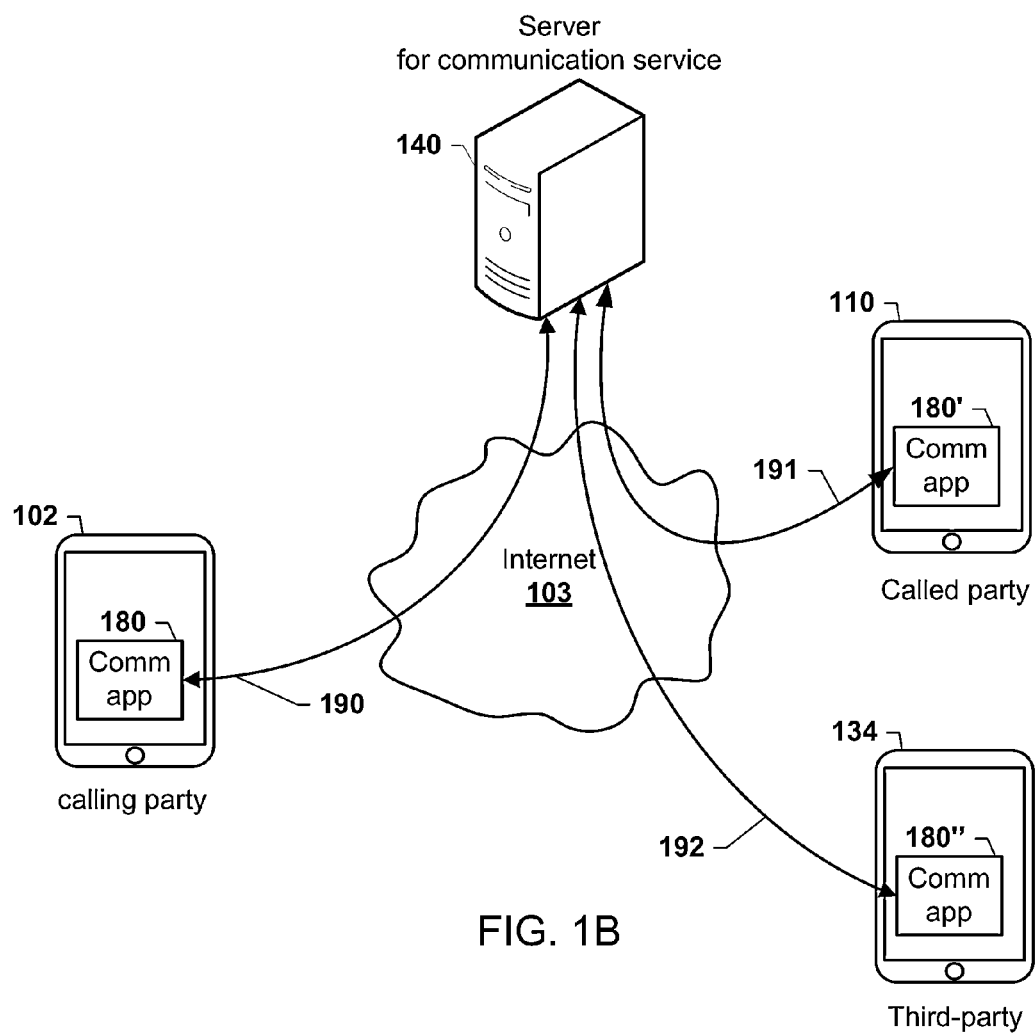
FIG. 1B is communication system diagram illustrating messaging (or signaling) between a calling party computing device, a called party computing device, a third-party computing device, and a server computing device associated with a communication service suitable for use in various embodiments.

FIG. 1B illustrates various messaging that may be exchanged between computing devices 102, 110, 134 and a server computing device 140 associated with a communication service (e.g., an Internet protocol (IP) calling service, etc.) according to an embodiment. As described above, communications (or calls) associated with the communication service may be transmitted over the Internet 103 by the computing devices 102, 110 executing an application 180, 180', 180" that corresponds to the communication service (referred to as "Comm app" in FIG. 1B). For example, the computing devices 102, 110, 134 may all execute a PTT call app. Such an application 180, 180', 180" may be software, an app, routines, and other operations configured to enable the exchange of media rich communications via the communication service.

The server computing device 140 may exchange signals with the third computing device 134 (referred to in FIG. 1B as the third-party) via a connection 192, signals with the second computing device 110 (referred to in FIG. 1B as the called party) via a connection 191, and/or signals with the first computing device 102 (referred to in FIG. 1B as the calling party) via a connection 190. For example, the server computing device 140 may receive a call request for a video call via the connection 190 from the first computing device 102 and transmit the call request to the second computing device 110 via the connection 191. The server computing device 140 may be configured to use the connections 190, 191, 192 to route signals between any of the computing devices 102, 110, 134 for use via their respective applications 180, 180', 180".

However, when an application 180, 180', 180" is not actively executing (i.e., not loaded, etc.) or a user is unreachable on his/her respective computing device (e.g., on another line, does not hear ringing due to low volume, etc.), the computing devices 102, 110, 134 may not be able to exchange signals via the connections 190, 191, 192. For example, the second computing device 110 may not participate in an IP communication using a video chat application when the second computing device 110 has closed/terminated the application 180' or when the server computing device 140 no longer has access to the current status data of the second computing device 110 (e.g., out of date computing device registration information, IP address, etc.). When computing devices are unreachable, call requests associated with the communication service may be unanswered. To address this situation, the server computing device 140 may be configured to transmit a call request notification to a third-party determined to be in the same area (or proximity) of the called party in order to reach the called party via a re-routed call.

As an illustration: the computing devices 102, 110, 134 may periodically transmit current status data (e.g., location coordinates, etc.) to the server computing device 140 via the connections 190, 191, 192 respectively. The server computing device 140 may identify that the second computing device 110 is nearby the third computing device 134 based on the current status data. A call request to establish a video chat with the user of the second computing device 110 (i.e., the called party) may be sent to the server computing device 140 by the user of the first computing device 102 (i.e., the calling party) via the connection 190. In response, the server computing device 140 may relay the call request to the second computing device 110 via the connection 191. After a predetermined period of time expires without the user of the second computing device 110 accepting the call request (i.e., a timeout occurs), the server computing device 140 may transmit information about the call request (i.e., a call request notification) to the third computing device 134 via the connection 192. In response, the third computing device 134 may receive user inputs via the application 180", and may transmit an acceptance of the call to the server computing device 140 via the connection 192. The server computing device 140 may transmit an authentication challenge message or signal via the connection 192 which may be responded to by the called party using the third computing device 134 (e.g., enter a secret PIN). When the identity of the called party is confirmed with a correct authentication challenge answer received at the server computing device 140 via the connection 192, the server computing device 140 may establish and administer the call between the calling party using the application 180 on the first computing device 102 and the called party using the application 180" on the third computing device 134.

FIGS. 2A-2D illustrate various exemplary displays of information that may be presented on a third-party computing device 134 in response to receiving a call request notification associated with a communication service. As described above, when a called party is not reachable for communicating via a communication service on his/her own computing device, a server computing device associated with the communication service may transmit a call request notification to reach the called party at a third-party computing device 134. Such call request notifications may include various types and amounts of data (i.e., presentation information) that may be presented to solicit a call acceptance by the called party on the third-party computing device 134 without compromising the privacy and preferences of the calling party and/or the called party. As described above, in various embodiments, presentation information may include identification information (e.g., calling party ID, called party ID, etc.), a privacy mode (e.g., private, public, friends-only, etc.), a call type (e.g., voice call, video call, etc.), call media to be transmitted with the incoming communication, and/or other contextual information (e.g., a topic, an association, etc.). It should be noted that sensitive information and other materials within the presentation information of a call request notification may be determined at the server computing device associated with the communication service based on stored user profiles. In this manner only information authorized by the calling party and/or the called party may ever be received at the third-party computing device 134, regardless of what may be visually or audibly presented to a user of the third-party computing device 134.

The third-party computing device 134 may be configured to render different messages, graphical elements, and other information on a panel 210 (e.g., touch screen, LCD display unit, etc.) of the third-party computing device 134 based on the presentation information within received call request notifications. In various embodiments, information rendered in response to received call request notifications may be displayed within an application (or app) associated with the related communication service or alternatively may be rendered using system functionalities of the third-party computing device 134. For example, the third-party computing device 134 may render call request information within dialog boxes, prompts, notifications within a system dashboard, and/or pop-up windows enabled by an operating system, or alternatively as sounds rendered via a speaker (e.g., text-to-speech audio, clicks, bells, pre-recorded audio samples, etc.).

Figure 2A:
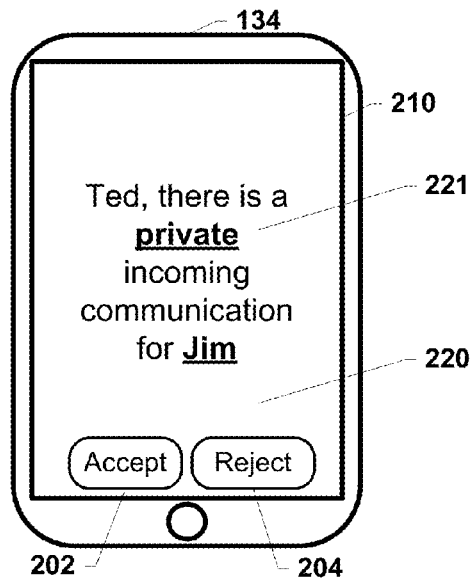
FIGS. 2A-2D are diagrams illustrating various displays of information of call request notifications presented on a third-party computing device suitable for use with various embodiments.

FIG. 2A illustrates an exemplary display 220 of presentation information within a communication service application rendered on the panel 210 of the third-party computing device 134. The display 220 may include a message 221 that indicates the third-party computing device 134 may accept a private incoming communication for a called party (referred to as "Jim" in FIG. 2A). In other words, the third-party computing device 134 may have received a call request notification that includes the minimum presentation information of only the called party's identity ("Jim").

The display 220 may further include a first graphical user interface button 202 configured to transmit an acceptance signal when selected with user inputs (e.g., touch inputs), and a second graphical user interface button 204 configured to transmit a rejection (or denial) signal when selected with user inputs. For example, when the third-party user (referred to as "Ted" in FIG. 2A) of the third-party computing device 134 sees the called party ("Jim") is next to him/her in a meeting room, the third-party user may click the "Accept" button 202 and hand the phone to the called party to further authenticate and accept the incoming call. As another example, when the third-party user ("Ted") of the third-party computing device 134 does not see the called party ("Jim") nearby in the meeting room, does not know the called party, or otherwise is unwilling to let the called party use his/her computing device for the incoming communication (e.g., the third-party may be already making a call, etc.), the third-party user may click the "Reject" button 204 to abort a call setup.

Figure 2B:
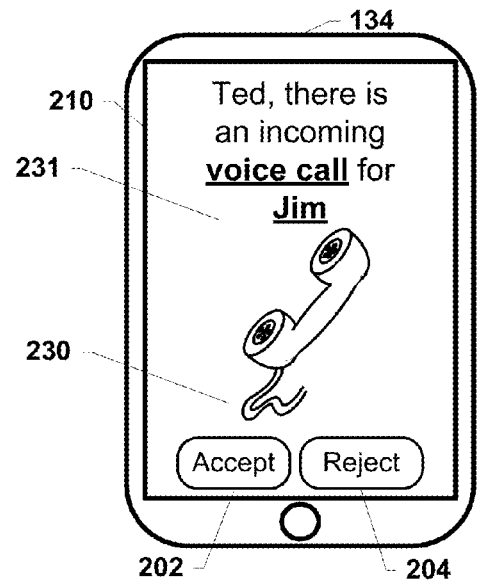

FIG. 2B illustrates another exemplary display 230 of presentation information within the communication service application rendered on the panel 210 of the third-party computing device 134. The example display 230 illustrated in FIG. 2B is similar to the display 220 illustrated in FIG. 2A and described above, except that the display 230 may include a message 231 that indicates the third-party computing device 134 may receive a voice call for the called party ("Jim"). In other words, the third-party computing device 134 may have received a call request notification that includes presentation information indicating both the called party's identity ("Jim") and the type or mode of the incoming communication (e.g., a voice call).

Figure 2C:
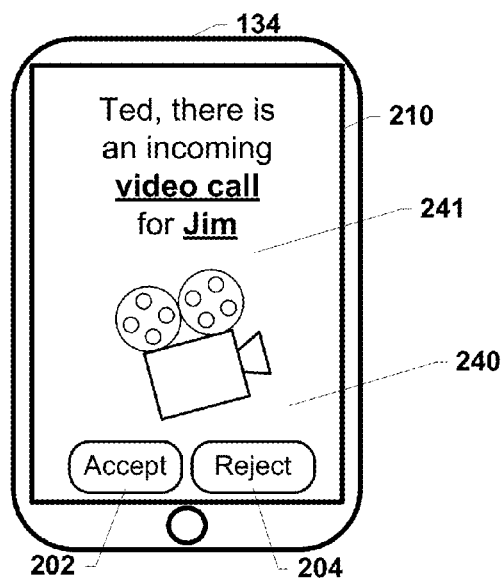

FIG. 2C illustrates another exemplary display 240 of presentation information similar to the display 230 illustrated in FIG. 2B, except that the message 241 of the display 240 indicates a different type of mode of incoming communication (e.g., video call).

Figure 2D:
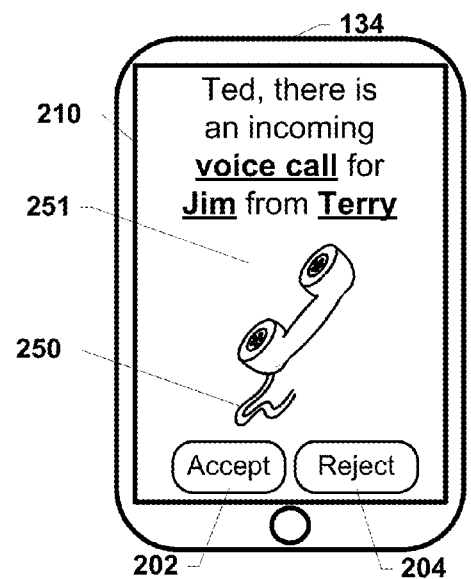

FIG. 2D illustrates another exemplary display 250 of presentation information within the communication service application rendered on the panel 210 of the third-party computing device 134. The display 250 may be similar to the displays 220, 230, 240 described above and illustrated in FIGS. 2A-2C, except that the display 250 may include a message 251 that indicates the third-party computing device 134 may receive a voice call for the called party ("Jim") from an identified calling party (referred to as "Terry" in FIG. 2D). In other words, the third-party computing device 134 may have received a call request notification that includes presentation information indicating both the called party's identity ("Jim"), the calling party's identity ("Terry"), and the type or mode of the incoming communication (e.g., a voice call).

FIGS. 3A-3D illustrate a sequence of example displays of information presented on a third-party computing device 134 in response to receiving user inputs related to a call request notification. Based on presentation information within a received call request notification from a server computing device associated with a communication service, the third-party computing device 134 may render a display 301 on a panel 210 (e.g., a touch screen) that may include a message 302, a first graphical user interface button 202 configured to transmit an acceptance signal, and a second graphical user interface button 204 configured to transmit a rejection (or denial) signal. The message 302 may indicate the third-party computing device 134 has received a call request notification for the called party (referred to as "Jim" in FIGS. 3A-3D). A third-party user (referred to as "Ted" in FIG. 3A) may select the first graphical user interface button 202, such as by using his/her finger 300 to provide a touch input on the button 202, resulting in the acceptance signal being sent to the server computing device associated with the communication service. In another embodiment, the called party may provide user inputs to select one of the buttons 202, 204.

In response to the selection of the first graphical user interface button 202, the third-party computing device 134 may render a display 331 on the panel 210 that may include a message 332 with an authentication challenge, such as a prompt for the called party ("Jim") to enter a PIN, as illustrated in FIG. 3B. The display 331 may also include a feedback graphical element 334, such as an obscured PIN presentation, as well as an input element 336 (e.g., a soft keyboard, number pad, etc.) configured to receive user inputs, such as touch inputs from the finger 330 of the called party. In response to receiving user inputs answering the authentication challenge, the third-party computing device 134 may transmit a signal to the server computing device associated with the communication service.

In an optional embodiment illustrated in FIG. 3C, once the called party has been authenticated by the server computing device associated with the communication service based on user inputs that answer the authentication challenge, the third-party computing device 134 may render a display 351 on the panel 210 of a message 352 that includes complete presentation information from a subsequently received signal from the server computing device. In particular, the message 352 may include the calling party's identification (referred to as "Terry R." in FIG. 3C), as well as descriptive information of the topic and/or context for the related call (e.g., "work-related"). The message 352 may prompt the called party ("Jim") to accept or reject the call in light of the complete presentation information, and thus the display 351 may include a first graphical user interface button 362 configured to transmit an acceptance signal, and a second graphical user interface button 364 configured to transmit a rejection (or denial) signal. The called party ("Jim") may select the first graphical user interface button 362, such as by using his/her finger 330 to provide a touch input, resulting in the acceptance signal being sent to the server computing device associated with the communication service.

In response to the optional selection of the first graphical user interface button 362 in FIG. 3C or the authentication challenge answer input in FIG. 3B, the third-party computing device 134 may render a display 371 on the panel 210 illustrated in FIG. 3D that may include a message 372 indicating the incoming communication has been accepted. The message 372 may include the complete presentation information of the call request, such as by indicating the identity of the calling party and the context (e.g., work-related).

Figure 4A:
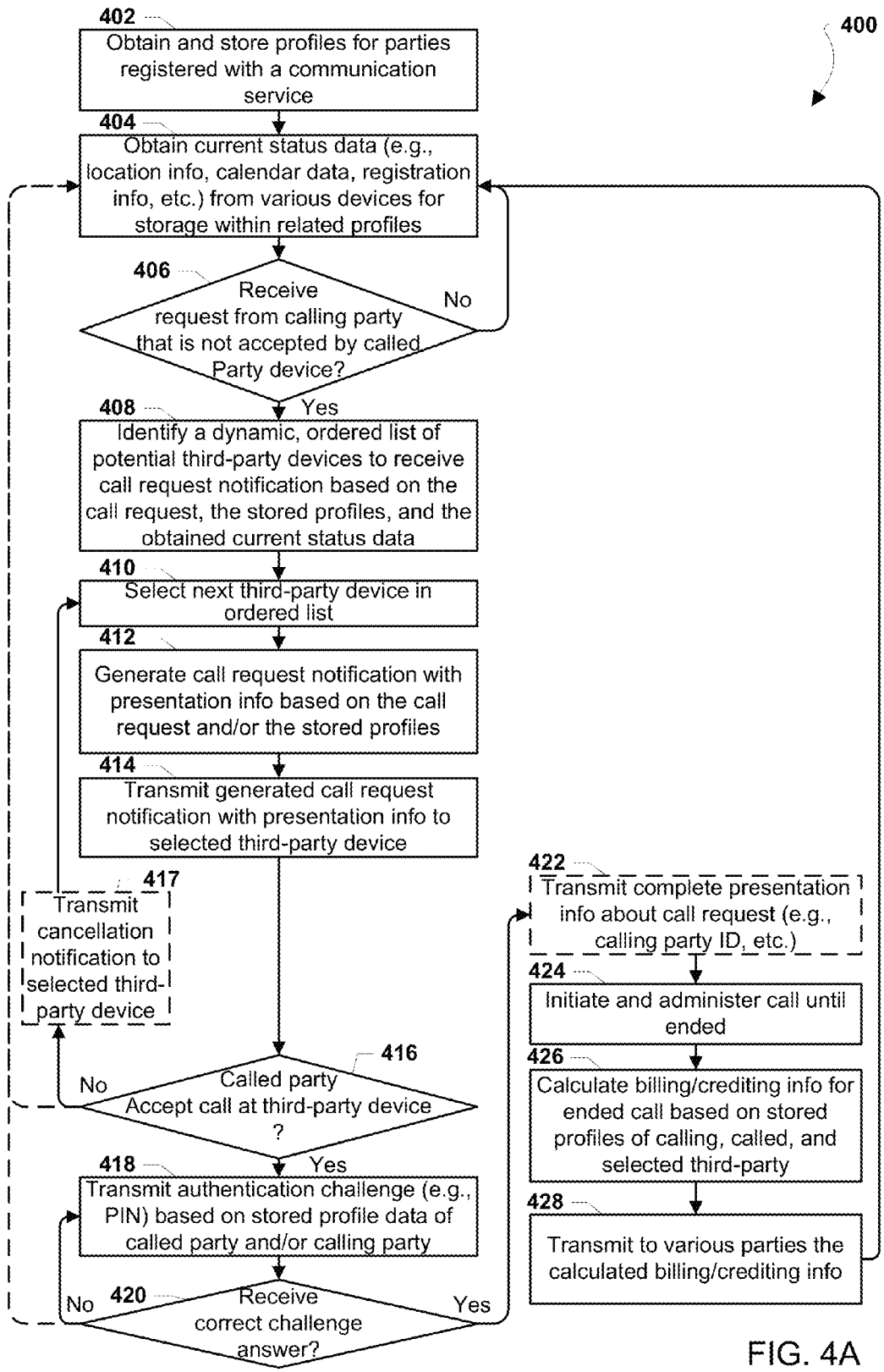
FIGS. 4A-4C are process flow diagrams illustrating embodiment methods for a server computing device associated with a communication service to initiate a call between a calling party computing device and a third-party computing device utilized by a called party.
Figure 4B:
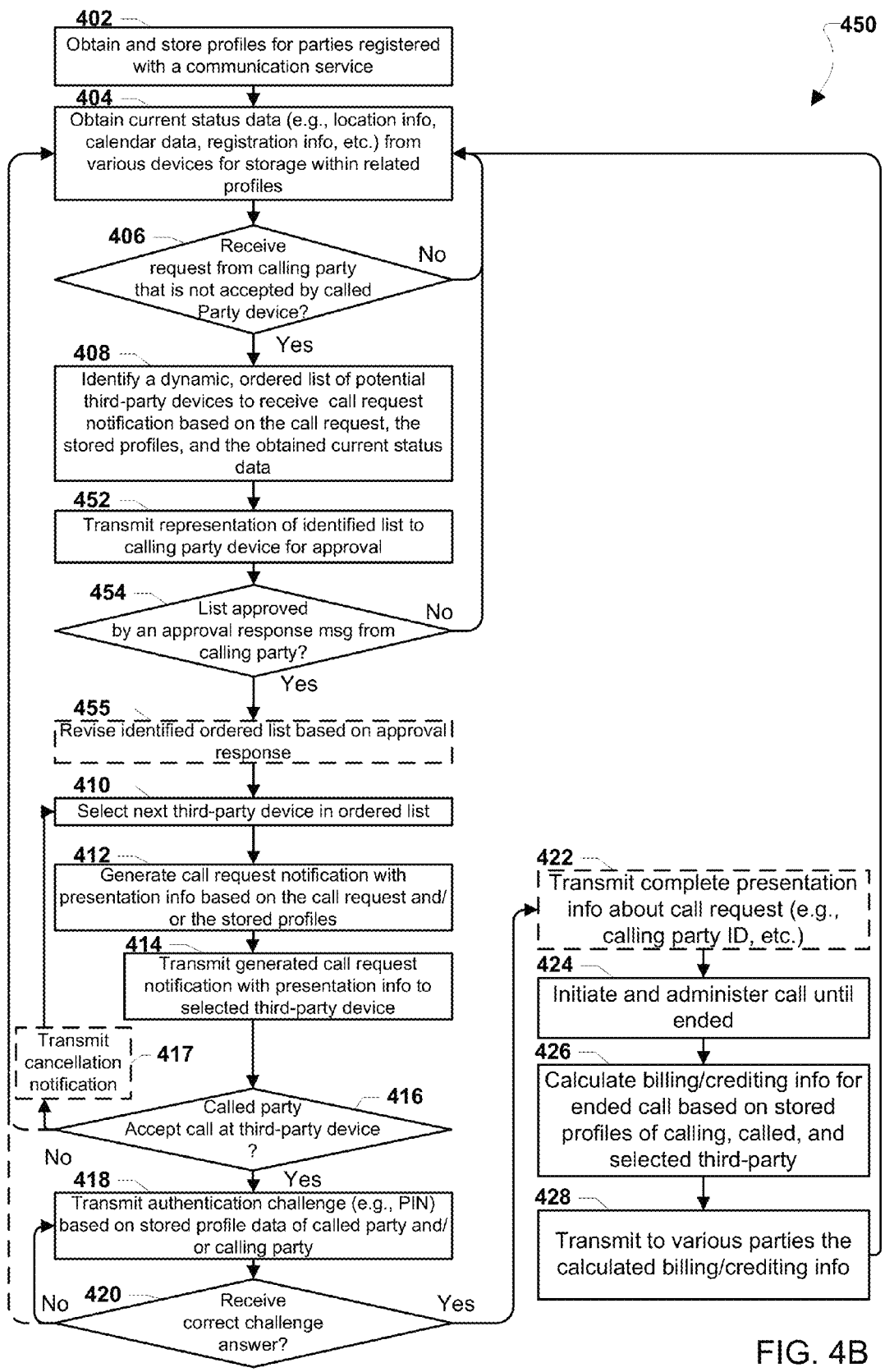
Figure 4C:
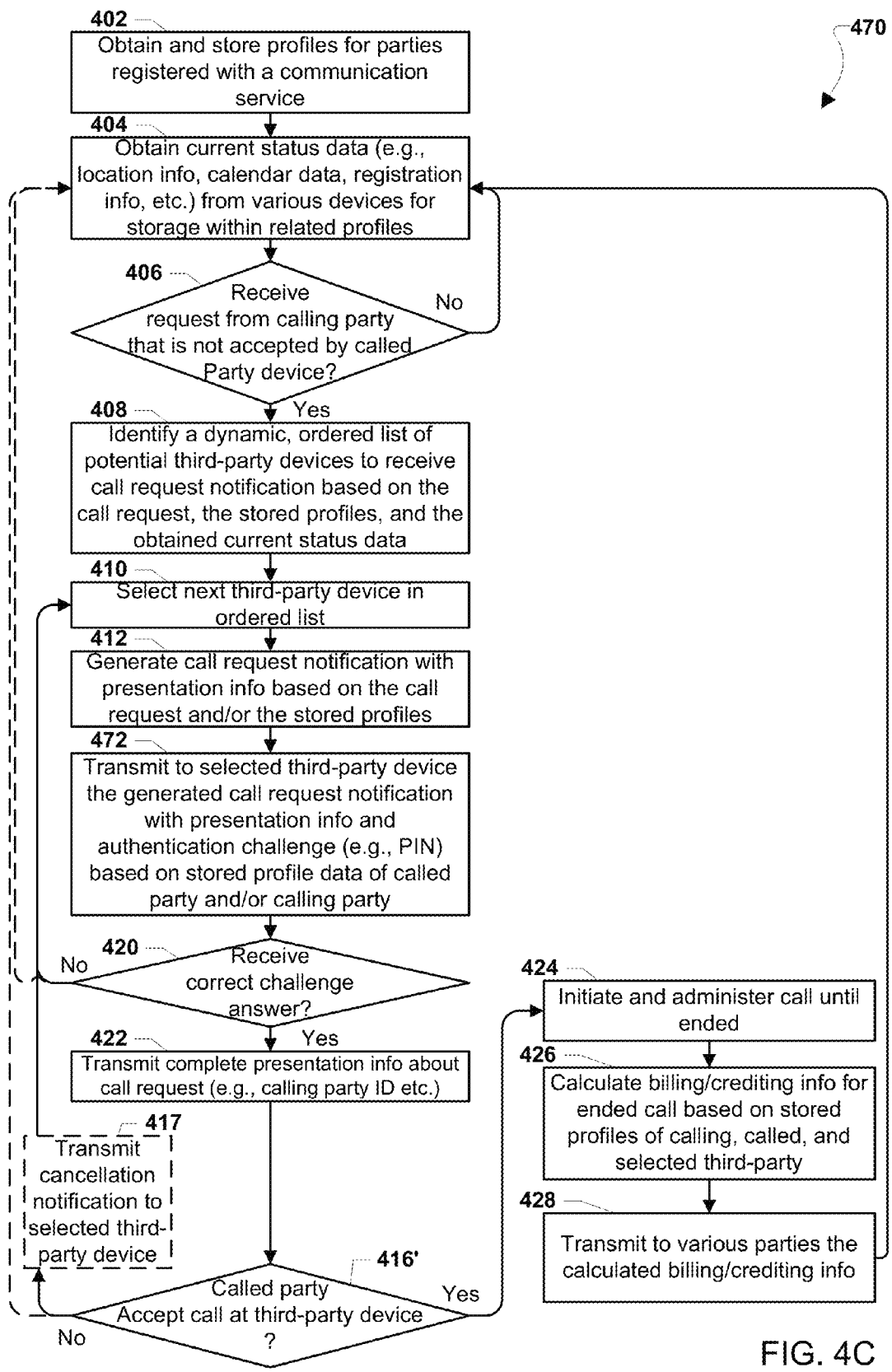

FIGS. 4A-4C illustrate embodiment methods 400, 450, 470 for a server computing device associated with a communication service to initiate a call between a calling party computing device and a third-party computing device utilized by a called party. In these example methods, the calling party and the called party are presumed to have "opted in" to a program for re-routing calls to third-party computing devices, such as during a registration via website associated with the communication service. For example, the parties may have opted in as part of providing information to the server computing device in block 402.

Referring to FIG. 4A, in block 402 the processor of the server computing device may obtain and store profiles for parties registered with a communication service, such as storing data for various users who may utilize the communication service to initiate and/or receive IP calls using an application (or app). Profiles may be obtained and stored during a set-up or registration of individual users, such as when a user accesses the server computing device via a registration web portal or establishes a user account via a communication service application. The stored profiles may be associated with individual users or parties, such as a called party, a calling party, and/or a third-party (or a plurality of third-parties), and may include data identifying the parties. As noted above, the server computing device may store profiles within data records of a database.

A profile of a user may include profile data such as the user's name, street address, email address, demographics (e.g., age, sex, etc.), imagery associated with the user (e.g., a picture, head shot, avatar, etc.), identity authentication/verification data (e.g., voice samples, retina scan imagery, facial recognition data, etc.), professional information (e.g., place of business/employer, industry, occupation, etc.), contact information of computing devices associated with the user (e.g., phone number, application username or identifier, etc.), carrier information (e.g., cell network provider, long-distance provider, etc.), and status data (e.g., a current location, a set of previous locations, sensor data, signal strength, computing device registration information for wireless networks, scheduling information or calendar data, social networking updates, etc.). For example, the server computing device may store in a profile the name, cell phone number, college alma mater, employer company name, church name, surname of in-laws, and profile identifier for a best friend for a registered user. As another example, the server computing device may store in a profile the last known GPS coordinates, as well as accelerometer sensor data values from a smartphone associated with a registered user.

In an embodiment, a user's stored profile may also include credentials (e.g., username, passwords, etc.) for accessing accounts with other services, such as social networking sites.

In another embodiment, a user's stored profile may include data indicating whether the user consents or "opts-in" to a call re-routing program implementing various embodiments. Further, a profile may include permissions or other privacy settings that indicate the level or amount of information (e.g., name, contact number, device type, etc.) that the server computing device may share with other devices when re-routing a call. For example, a registered first user's profile may store data indicating what descriptive information from the profile may be transmitted by the server computing device to a calling party device when soliciting the calling party's approval to use the registered first user's computing device to receive a call originally intended for an otherwise unreachable second user's computing device (i.e., the called party's smartphone).

Stored profiles may further include information that the server computing device may utilize to identify third-party computing devices that may receive call request notifications when a called party is unreachable on his/her own computing devices. A profile may include links, identifiers, or other information associating a registered user's profile with the profiles of other, known associates of the user. For example, the server computing device may store profile data indicating the usernames of friends, family, co-workers, and fellow club members of a particular user.

Profiles may also include characteristic traits, demographics, common interests/groups, conditions, or other associations that may be matched by the server computing device to identity registered users with connections or pre-existing relationships enabling them to potentially receive call request notifications for another user and vice versa. For example, stored profiles may include data representing alma maters, current employers, churches, and local club memberships that may be used by the server computing device to identify connections, relationships, or similarities between users with stored profiles.

In an embodiment, during a registration procedure, each user may indicate the names of known associates, or alternatively may indicate organizations or other affiliations that may be used by the server computing device to identify connections between profiles and each user. For example, a user during registration with the communication service may indicate that a "membership" data field for his/her profile may include the names of his/her church and/or division at an employer that may be cross-referenced with data in other profiles.

Stored profiles for registered users may also include stored user-defined preferences, such as logic, guidelines, rules, weights, preferences, priorities, rankings, or other information, that the server computing device may utilize when identifying third-party computing devices that may receive call request notifications. For example, a registered user may indicate that the server computing device should order co-workers from a certain office building higher than workers from another office building when identifying third-parties (or third-party computing devices) for receiving calls for the registered user when unreachable on his/her computing device. In various embodiments, such user-defined preferences may be simple associations (e.g., favor co-workers over family members when a call comes in, etc.) or alternatively may include many conditions the server computing device may evaluate (e.g., favor co-workers over family members when a call is work-related and the user is not in his/her house and the time is during typical work hours, etc.). It should be noted that although profiles may include such user-defined preferences, the server computing device may be configured to compile or generate ordered lists of potential third-party computing devices to receive incoming calls for a registered user, and accordingly such identifications may utilize user-defined preferences to varying degrees. For example, based on an analysis of the locations, affiliations, and signal strengths of a plurality of third-party computing devices, the server computing device may identify a third-party computing device to receive an incoming call for a registered user that does not comply with the registered user's stored profile preferences.

In block 404, the processor of the server computing device may obtain and store current status data from various computing devices (or a plurality of computing devices) of registered parties for storage within related profiles. Current status data may include updated or current location information (e.g., GPS coordinates, nearby computing devices, etc.), scheduling information (e.g., calendar data, meeting schedule from an online calendar, etc.), signal strength, activity data (e.g., on a call, ended a call, currently receiving user inputs, active applications, sensor data, etc.), and computing device registration information (e.g., current SSID, IP address, or other access point identifier).

Computing devices registered with the communication service may be configured to periodically upload current status data to the server computing device, such as by uploading GPS coordinates every few seconds, minutes, hours, days, etc. In an embodiment, computing devices of registered users of the communication service may be configured to upload current status data in response to detecting events or predefined conditions, such as a change in location or computing device registration information (e.g., transmit updated SSID when a computing device connects to a new access point, etc.).

In an embodiment, the server computing device may also receive other updated information for storage in user profiles, such as updated user preferences, employer information, and memberships. For example, the server computing device may receive periodic messages from a registered user's smartphone indicating the social networking apps the user is currently registered to use on that smartphone. As another example, the server computing device may receive a message from a registered user's laptop in response to the registered user updating account data associated with the user (or the laptop) to indicate a change of home address or place of employment.

In an embodiment, the server computing device may be configured to scrape or otherwise retrieve current status data from websites or online accounts associated with the various user profiles. For example, when a registered user authorizes the server computing device to be connected to the user's account on a social networking site, the server computing device may utilized stored credentials for the site to log-in to the user's account and retrieve that latest status information (e.g., dating status, GPS coordinates, latest head shot, friends list, employer name, etc.).

In determination block 406, the processor of the server computing device may determine when there is a call request using the communication service from a calling party computing device that is not accepted by a computing device of the called party. In other words, the server computing device may determine whether the called party is unreachable for a call at his/her computing device based on an unanswered call request from the computing device of the calling party. In particular, in response to receiving a call request signal from the calling party computing device, the server computing device may relay the call request as a signal to the called party computing device and determine whether the call request has timed-out (e.g., due to unreachable or unknown IP address due to a fade or outage in coverage, etc.), been rejected by the called party, has been re-transmitted by the server computing device a predefined number of attempts, or otherwise has not been accepted by the called party. For example, the server computing device may determine whether a call request signal transmitted to a called party smartphone has gone unanswered for a predefined number of seconds or alternatively a predefined number of attempts.

While the server does not detect that a call request from the calling party is not accepted by the computing device of the called party (i.e., determination block 406="No"), the server computing device may continue to receive or obtain additional or updated status data from various computing devices of registered users of the communication service in block 404.

In response to the server computing device determining that there is a call request from the calling party that is not accepted by the computing device of the called party (i.e., determination block 406="Yes"), the processor of the server computing device may identify potential third-party computing devices to receive a call request notification and compile or generate a dynamic, ordered list of the identified third-party computing devices based on the call request, the stored profiles, and/or the obtained current status data in block 408. For example, in block 408 the server computing device may generate a list of smartphones of co-workers of the called party that are registered with the communication service. The server computing device may be configured to find the best or most appropriate third-party computing devices (i.e., devices associated with a plurality of third-parties having profiles with the communication service) for receiving a call request notification, and thus may be configured to utilize various scoring, ranking, and/or filtering algorithms that may use data accessible by the server computing device. In various embodiments, the server computing device may only identify potential third-party computing devices associated with user profiles that have opted in to participating in a program for re-routing calls. In other words, third-party computing devices may only be identified when their associated users have explicitly agreed to be used to receive calls for other parties.

In an embodiment, the server computing device may use current status data of the called party to perform look-ups in a database of stored profiles of other registered users to find potential third-party computing devices. In particular, the server computing device may perform database look-up operations to find profiles of devices having current location information within a predetermined tolerance threshold of the last known (or current) location of the called party's computing device. For example, the server computing device may identify the called party's smartphone GPS coordinates from current status data stored in the called party's profile, and may perform a look-up on all registered user profiles to find any devices that have recently reported GPS coordinates within the same general area (e.g., an office, a bar room, a house, etc.). Alternatively, the server computing device may perform a database look-up on profile data using the computing device registration information from the called party's computing device (e.g., SSID) to find any other profiles with matching information. For example, based on an SSID or other device identifier, the server computing device may identify all the smartphones registered with the communication service that are connected to the same Wi-Fi router as the called party's smartphone. Alternatively, the server computing device may perform database look-up operations to find profiles of devices having calendar data or entries that reference the same event or information as indicated within the called party's stored profile data for a particular time. For example, the server computing device may find all profiles with recent calendar data indicating the related users are attending a meeting with the called party.

In an embodiment, as part of the operations in block 408 the server computing device may analyze accessible data to determine contextual information that may be used to identify appropriate third-party computing devices. For example, when a call request is determined to be personal in nature, the server computing device may generate a list that prioritizes the smartphones of friends and family over computing devices of co-workers or clients. In particular, the server computing device may analyze, parse, and otherwise process the received call request and/or data within stored profiles to identify any contextual information. The server computing device may evaluate the stored profile of the calling party and/or the stored profile of the called party to infer a likely content or context of the call request. The server computing device may compare any associations, memberships, interests, or other characteristics stored within the calling party and/or called party profiles to identify similarities. For example, the server computing device may identify that both the calling party and the called party have the same employer and thus may determine the call request is work-related. As another example, the server computing device may identify that both the called party and the calling party both have the same surname and/or have listed the other as a relative, and thus the server computing device may determine the call request is for a personal or family-related call.

In an embodiment, as part of the operations in block 408 the server computing device may evaluate numerous conditions, such as time of day and memberships of the called party and/or calling party, to identify the context or content of the call request. For example, when the call request is received on a weekday during typical business hours (e.g., Monday-Friday, 9:00 AM-5:00 PM), the call request from a co-worker calling party may be identified as work-related in nature; however, when the call request is received during a weekend at night (e.g., Saturday-Sunday, after 5:00 PM), the call request from a co-worker calling party may be identified as personal in nature.

In another embodiment, as part of the operations in block 408 the server computing device may use metadata, header information, language (e.g., typed or spoken), or other explicit data transmitted with the received call request that may indicate the context or content of the call, as well as the relationship between the calling party and the called party. For example, the received call request may include data indicating the called party is flagged as a "friend" or "family" in the calling party's address book. As another example, the server computing device may process via natural language processing routines the text or spoken content of the call request to identify the calling party wants to chat about work, a baseball game, or parents.

In an embodiment, as part of the operations in block 408 the server computing device may analyze stored profile data to identify similar and/or related registered users who may be appropriate third-party computing devices. The server computing device may use interest groups, employers, family names, and other characteristics of the called party to perform searches for other profiles having the similar characteristics. For example, the server computing device may perform a look-up on a profile database to return profiles of registered users who work for Company X.

In various embodiments, as part of the operations in block 408 the server computing device may rank order or prioritize the list of potential third-party computing devices based on various current status data and/or profile data. For example, all potential third-party computing devices may be ordered from closest to farther from the GPS coordinates of the called party's computing device. As another example, all potential third-party computing devices may be ordered based on predefined preference list placing relatives higher in importance than friends. The server computing device may utilize any single factor (e.g., distance from called party, calendar data, club memberships, etc.) or any combination of factors to order the identified potential third-party computing devices (and/or their registered users). For example, although a first smartphone may be closer to the called party's laptop than a second smartphone based on signal strength information, the server computing device may order the second smartphone higher in the list as the second smartphone may be associated with the same sporting club as the called party.

In an embodiment, as part of the operations in block 408 the server computing device may also use profile data indicating activity to order potential third-party computing devices. In other words, when there may be multiple potential third-party computing devices with similar attributes, such as associated clubs, employer, etc., the server computing device may prioritize devices that may be more likely to be in use by users and thus more available for accommodating the call of the received call request. For example, a first smartphone associated with a first user profile storing recent accelerometer sensor data that indicates the first smartphone is being carried may be ordered above a second smartphone with a second user profile storing recent accelerometer sensor data indicating no movement. As another example, when the user profile associated with a first smartphone does not include up-to-date computing device registration information or the first smartphone has not otherwise checked-in with the server computing device in a long time period, the first smartphone may not be given priority over other devices. As yet another example, when the user profile associated with the first smartphone includes calendar data that indicates the related user is in a meeting, the first smartphone may not be given priority to receive a call request as it may likely be unreachable due to the meeting.

In an embodiment, as part of the operations in block 408 the server computing device may compile or generate the ordered list of candidate third-party computing devices from a set of devices or users pre-approved by the called party. In this embodiment, stored profile data may indicated that the called party has elected or authorized that only a certain set of third-party computing devices may ever be contacted with call request notifications when the called party is unreachable on his/her own computing devices. In this embodiment as part of the operations in block 408 the server computing device may dynamically pick a selection of the called party's identified authorized third-party computing devices and order the selection to choose the best third-party computing device for any given time. The ordering may be based on various factors as described above, except that only the current status data of the approved devices may be evaluated. For example, the server computing device may identify that an approved first smartphone of a friend should be contacted prior to an approved second smartphone of a co-worker based on their locations respective to the last known GPS coordinates of the called party's smartphone.

In another embodiment, the server computing device may perform the operations in block 408 periodically, such as at a regular interval for each registered user of the communication service so that the server computing device can immediately re-route an incoming call without delay associated with creating an ordered list of suitable destination third-party computing devices. In other words, potential third-party computing devices may be identified for each registered user on a scheduled basis regardless of any pending call request. For example, once every predetermined period (e.g., minutes, hours, days, etc.), the server computing device may determine a set of computing devices that are nearby to each registered user and otherwise appropriate for receiving calls for each registered user in the event the registered user is unreachable via his/her own computing device.

In an embodiment, the server computing device may rank certain third-party computing devices in the list based on previous experiences with the devices. For example, the server computing device may rank a first third-party computing device higher in the ordered list (i.e., higher priority) when communications have been successfully received by the called party at the third-party computing device in the past. As another example, the server computing device may rank a second third-party computing device lower in the ordered list (i.e., lower priority) when a calling party has declined to use the second third-party computing device in the past.

In another embodiment, the server computing device may generate the ordered list of potential third-party devices based on previous authentication challenges and answers. As described below, the identity of the called party may be tested with authentication challenges transmitted by the server computing device (e.g., prompts for a PIN, etc.). When answers to these authentication challenges are correct or incorrect, the server computing device may associate the third-party computing device transmitting these answers with a higher or lower ranking in ordered lists based on the correctness of the answers. In particular, the server computing device may demote or decrease the ranking/priority of a third-party (or the third-party's computing device) in subsequent ordered lists of potential third-party recipients when wrong answers to authentication challenges are received from the third-party computing device, and promote or increase the ranking/priority of the third-party in subsequent ordered lists of potential third-party recipients when correct answers to the authentication challenges are received from the third-party computing device. In this way, the server computing device may generate the ordered list to avoid attempting to communicate with third-party computing devices that may be used by nefarious parties (e.g., spoofers, etc.) or that may be malfunctioning or otherwise incapable of being used by the called party to properly answer authentication challenges and conduct a communication with the calling party. In other words, by using previous answers to authentication challenges to order the list, the server computing device may make certain third-party computing devices preferred or non-preferred potential recipients. In an embodiment, the server computing device may rank potential third-party computing devices based on at least the number and/or frequency of correct versus incorrect answers to authentication challenges received from those third-party communication devices. The number and/or frequency of correct versus incorrect answers may be over a predefined time period or in association with a location.

Returning to FIG. 4A, the processor of the server computing device may select a next third-party computing device in the ordered list in block 410. For example, the server computing device may select the highest priority smartphone on the ordered list that has not already been contacted regarding the received call request. In block 412, the processor of the server computing device may generate a call request notification with presentation information based on the call request and/or the stored profiles. The call request notification may be configured to provide data needed for the selected third-party computing device to render information that may be seen by the related third-party user and/or the called party. In an embodiment, the call request notification may include a code or other identifier related to the call request that may be used by the server computing device and/or the selected third-party computing device to reference and track other signals transmitted and/or received relating to the call request.

The called party and/or the calling party may not desire to have sensitive or personal information disclosed within a call request notification. For example, when the server computing device identifies the selected third-party computing device based purely on distance to the called party as opposed to a pre-existing relationship between the called party and the user of the selected third-party computing device, the calling party may not want his/her name or the context of the call to be easily seen by the user of the selected third-party computing device. So, in order to protect privacy, as part of the operations in block 412 the server computing device may include presentation information authorized based on privacy settings or preferences or other guidelines stored in the profiles of the called party and/or calling party. For example, based on default presentation information preferences stored within the calling party's profile, the server computing device may not include contextual information (e.g., "work-related," "family-related," "Not work related or 'NWR,' etc.) within a call request notification. As another example, based on user-defined rules within the called party's stored profile, the server computing device may only include the called party's full last name in the call request notification when the selected third-party computing device is associated with a friend of the called party and/or when the call request relates to a work topic. In an embodiment, by default, as part of the operations block 412 the server computing device may include only the minimal information required to identify the called party within the presentation information. For example, the server computing device may only include information that may enable a third-party computing device to render a display of the called party's name and/or the called party's cell phone number.

In block 414, the processor of the server computing device may transmit the generated call request notification with presentation information to the selected third-party computing device. For example, using contact information stored within the profile of the selected third-party computing device, the server computing device may transmit a signal that indicates the call for the called party may be accepted at the selected third-party computing device.

In determination block 416, the processor of the server computing device may determine whether the called party accepted the call at the selected third-party computing device. The server computing device may be configured to monitor a message buffer or otherwise scan for incoming signals from the selected third-party computing device that are associated with the call request notification. For example, the server computing device may compare codes or identifiers within received signals to detect when a signal is received from the selected third-party computing device that accepts the call.

In response to the server computing device determining that the called party did not accept the call at the selected third-party computing device (i.e., determination block 416="No"), the processor of the server computing device may transmit a cancellation notification to the selected third-party computing device in optional block 417, and then select the next third-party computing device in the ordered list in block 410, such as by selecting another, lower priority third-party computing device to contact to reach the called party. The optional cancellation notification may be a signal that indicates the call request notification is invalid or otherwise may not be responded to by the third-party computing device. This optional cancellation notification may be beneficial for avoiding late or redundant responses from third-party computing devices. For example, when a first third-party computing device does not respond (e.g., accept or reject) to a call request for the called party within a predefined period (e.g., a few seconds, minutes, etc.), the server computing device may transmit the cancellation notification signal to the first third-party computing device before sending the call request notification to a second third-party computing device so that the first and second third-party computing devices do not accept the call request simultaneously. The optional cancellation notification signal may include a code or other identifier related to the call request that may be used by the server computing device and/or the selected third-party computing device to reference and/or track signals related to the call request. In an optional embodiment, when the called party did not accept the call at the selected third-party computing device (i.e., determination block 416="No"), the server computing device may continue with the operations in block 404 for receiving/obtaining additional or updated status data from various computing devices of registered users of the communication service.

In response to the server computing device determining that the called party did accept the call at the selected third-party computing device (i.e., determination block 416="Yes"), such as by responding via the selected third-party computing device indicating that he/she is willing to take the call from the calling party, the processor of the server computing device may transmit an authentication challenge (e.g., a prompt for a PIN) based on the stored profile data of the called party and/or the calling party in block 418. The authentication challenge may be a request for the called party to supply identifying information that may be used to adequately authenticate the identity of the called party, such as a PIN, a voice sample, a finger print scan, a retina scan, or other inputs that may be evaluated against data stored on the server computing device to ensure the call is truly being answered by the called party and not an incorrect party. For example, the authentication challenge may be a prompt for at least one of a personal identity number (PIN), a biometric fingerprint scan, a spoken keyword, an iris scan, and an NFC tap (e.g., a tap from the called party's known unit or authentication "fob" that passes a hardware identifier, etc.).

In various embodiments, the authentication challenge in block 418 may request different types of information or inputs based on preferences stored within the calling and/or called party profiles. For example, the server computing device may determine that a four-digit PIN must be correctly entered by the called party on the selected third-party computing device in order for the call or more complete presentation information to be transmitted. As part of the operations in block 418 the server computing device may identify preferences within stored profiles that indicate different authentication challenges based on various conditions associated with the call request (e.g., time of day, context, media type, etc.), the identity of the calling party, the called party, and/or the user of the selected third-party computing device, and/or the conditions under which the called party is accepting the call request (e.g., the location of the selected third-party computing device). For example, based on user-defined preferences within the calling party's profile, when the current GPS coordinates of the selected third-party computing device coincide with the called party's home or office, the server computing device may transmit a simple PIN authentication challenge. As another example, based on user-defined preferences within the called party's profile, when the location of the selected third-party computing device are in an unknown location, the server computing device may transmit an authentication challenge requiring an image and voice sample for facial and voice recognition. In an embodiment, the server computing device may utilize the highest level of authentication based on the preferences of the profiles. For example, when the called party requires only a four-digit PIN but the calling party requires a higher-security alpha-numeric password, the server computing device may transmit an authentication challenge prompting the called party to enter the higher-security alpha-numeric password prior to receiving the call.

In an embodiment, the operations in block 418 and determination block 420 described below may be considered a PIN handshake procedure.

In determination block 420, the processor of the server computing device may determine whether a correct challenge answer is received from the called party via the selected third-party computing device, such as by comparing challenge answers received within an authentication answer message with data stored in the called party's profile. For example, the server computing device may compare a PIN within an authentication answer message to the PIN stored within the called party's profile at the time of registration with the communication service.

In response to the server computing device determining that the correct challenge answer is not received (i.e., determination block 420="No"), the server computing device may continue with the operations in block 418 for re-transmitting the authentication challenge. In an optional embodiment, in response to the server computing device determining that the correct challenge answer is not received (i.e., determination block 420="No"), the server computing device may continue with the operations in block 404 for obtaining additional or updated status data from various computing devices of registered users of the communication service. In another embodiment, the server computing device may be configured to communicate incorrect answers to the transmitted challenge authentication to the called party and/or the calling party. For example, in response to receiving an incorrect PIN or a certain number of incorrect PINs over a certain period of time, the server computing device may transmit an email, account notice, or other message to the called party or the calling party to indicate potentially nefarious activity by third-parties.

In response to the server computing device determining that the correct challenge answer is received (i.e., determination block 420="Yes"), the processor of the server computing device may transmit complete presentation information about the call request (e.g., calling party ID, etc.) in optional block 422. Complete presentation information may include all information the server computing device may have that is related to the call request, such as the calling party's identification (e.g., name, calling party device number, etc.) and the context of the call (e.g., topic, nature, etc.). The operations in optional block 422 may not be performed when the presentation information within the call request notification transmitted with the operations in block 414 include the complete presentation information.

In block 424, the processor of the server computing device may initiate and administer the call until it is ended. The initiation of the call may include the server computing device transmitting a confirmation message to the calling party computing device indicating the call will commence. The exchange of call data may continue until the calling party and/or the called party ends the call, or the connection is otherwise lost (e.g., due to bad signal strength, etc.). For example, the server computing device may establish a VOIP call between the calling party's smartphone and the selected third-party computing device until an end signal is received (e.g., when one of the parties hangs-up or presses 'End', etc.).

In block 426, the processor of the server computing device may calculate billing information and/or crediting information for the administered call (i.e., the ended call) based on the stored profiles of the calling party, the called party, and the third-party of the selected third-party computing device. In particular, the server computing device may be configured to calculate charges for the administered communication that may be billed to accounts held by the calling party and/or the called party. For example, charges may be billed to a cellular network provider account and/or an Internet service provider of the calling party and/or the called party.

Charges may be monetary values equivalent to the cost of using the third-party computing device's connection for the purpose of the ended call. For example, charges may include an amount of money owed to the selected third-party computing device's cellular network provider based on the duration and/or media type of the ended call. Alternatively, charges may be flat fees for using the selected third-party computing device for the ended call. For example, the server computing device may calculate that the called party and the calling party both owe a flat fee for using the selected third-party computing device to facilitate the ended call. In various embodiments, the server computing device may calculate the same charge for the calling party and the called party.

As part of the operations in block 426, the server computing device may be also or alternatively configured to calculate credits, incentives, or other awards that may be provided to the user of the selected third-party computing device based on the ended call. Such credits may include reimbursements or compensation for the data usage or other wide area network usage incurred by the third-party computing device, as well as compensation or incentives in the form of additional credits, money, or other compensation for agreeing to participate. For example, the server computing device may calculate a monetary award for the user of the selected third-party computing device that may be debited to an account held by a cellular provider. As another example, the server computing device may calculate a bonus award for the third-party based on the number of times the device has permitted his/her computing device to receive calls for another called party. Various schemes, equations, and calculations may be used by the server computing device in the crediting/billing calculation operations in block 426.

In an embodiment, the accounts associated with the calling party, called party, and user of the selected third-party computing device may be associated with another entity (e.g., a cellular network provider, an Internet service provider, etc.), or alternatively may be associated with the communication service itself. In an embodiment, the server computing device may be configured to use stored billing tables, standards, and other data provided by other service providers to perform the billing and/or crediting calculation operations in block 426. For example, the server computing device may download from a device associated with a network service provider (e.g., Internet service provider, a cellular network provider, etc.) the predetermined rates for data transfers via that network.

In block 428, the processor of the server computing device may transmit to various parties (e.g., called party, calling party, third-party, cellular network provider, etc.) the calculated billing and/or crediting information. For example, the server computing device may transmit messages to the called party computing device indicating the amount of money that will be charged to an account based on the ended call. The server computing device may continue the operations of the embodiment method 400 by obtaining additional or updated status data from various computing devices of registered users of the communication service in block 404.

FIG. 4B illustrates an embodiment method 450 that may be performed by a server computing device. The method 450 is similar to the method 400 described above, except the method 450 includes operations for submitting an ordered list of potential third-party computing devices to a calling party computing device for approval and/or adjustment. In other words, the server computing device may be configured to seek authorization from the calling party before re-routing a call to any third-party.

The operations in blocks 402-408 may be performed by the processor of the server computing device as described above with reference to FIG. 4A. In block 452, the processor of the server computing device may transmit a representation of the ordered list to the calling party computing device for approval. The representation may include formatting and other information that may be used by the calling party computing device to render the representation and solicit inputs from the calling party. The representation may include various data about the entire list of the identified potential third-party computing devices, such as the identification of the associated user (or user name), phone number, device type, and location for each device in the list. Alternatively, the representation may be obfuscated, generic, summarized, or otherwise abbreviated. For example, the representation may simply indicate the number of identified potential third-party computing devices. As another example, the representation may indicate the locations of the identified third-party computing devices without any identifying information about the related users.

The server computing device may generate the representation in block 452 based on default guidelines, such as by never disclosing personal information about third-parties to the calling party, or alternatively based on preferences within the profiles of the calling party and/or the users of the identified potential third-party computing devices. In other words, the server computing device may generate the representation that includes the entire ordered list of potential third-party computing devices, or a subset of the list, based on privacy configurations or preferences, such as rules defined within the profiles of the called party and/or the related third-parties. For example, a user profile associated with one of the identified potential third-party computing devices may only authorize a location and device type to be shared with a calling party computing device for approval purposes. As another example, another user profile associated with one of the identified potential third-party computing devices may decline to be identified to calling parties as a potential third-party recipient, and thus may be removed from the representation and/or the ordered list. In an embodiment, the server computing device may provide more details of individuals associated with devices in the ordered list of potential third-party computing devices when such individuals (or their devices) are known to the calling party. For example, when a first third-party computing device in the list is included in the calling party's address book for the communication service, the server computing device may include a full description of the first third-party computing device within the representation, however a second third-party computing device that is not already known by the calling party may only be indicated as an "available device."

In determination block 454, the server computing device may determine whether the ordered list of potential third-party computing devices is approved based on an approval response message received from the computing device of the calling party. The server computing device may monitor an incoming message buffer and evaluate code or other data within received message to identify whether the calling party has approved of using the ordered list for transmitting call request notifications and potentially re-routing the call. A received approval response message may include an itemized approval of each of the potential third-party computing devices in the ordered list, indicating which individual devices may be used by the server computing device for subsequent re-routing of the call related to the call request. The approval response message may also indicate a different order of the potential third-party computing devices. The server computing device may be configured to revise or otherwise modify the ordered list of potential third-party computing devices based on the received approval response message such that the ordered list may include only those devices approved by the calling party as well as any new ordering indicated within a received approval response message, such as described below with reference to optional block 455. For example, the server computing device may re-order the third-party computing devices in the ordered list, remove potential third-party computing devices from the ordered list, and/or otherwise update the ordered list based on a selection, deletion, or other information as indicated in an approval response message.

In an embodiment, regarding the operations in block 408, the server computing device may compile or generate the ordered list of potential third-party computing devices based at least in part on previous selections by a calling party. For example, based on selections from the calling party received over time via approval response messages, the server computing device may compile or generate an ordered list for a particular calling party and/or communication based on one or more previous selections made by the calling party such that a frequently selected third-party computing device may be promoted in the list. The server computing device may also generate the ordered list by comparing previous (or current) selections of the calling party of a particular third-party computing device over a certain time-period and/or location. For example, a certain potential recipient third-party computing device may be demoted within the ordered list when the calling party has previously declined to use the third-party computing device in a certain context (e.g., location, time of day, etc.).

In an embodiment, a received approval response message may indicate that no third-party computing devices may be used to re-route the call, such as by including an empty list (i.e., an empty approval response message) or data indicating a rejection of the ordered list. For example, an empty approval response message may be received at the server computing device when the calling party decides to reject the ordered list and abort a re-route of the call. In this way, a calling party may avoid re-routing his/her call and further may avoid being charged a fee or bill for utilizing the server computing device-enabled call re-routing.

In response to the server computing device determining that the ordered list is not approved by an approval response message received from the calling party computing device (i.e., determination block 454="No"), the server computing device may continue with the operations in block 404 for obtaining new status data from various registered devices. However, in response to the server computing device determining that the ordered list (or a part of the list) is approved by an approval response message received from the calling party computing device (i.e., determination block 454="Yes"), in optional block 455 the server computing device may revise the ordered list of potential third-party computing devices based on the received approval response message, such as by reordering the ordered list based on the selection made by the calling party (e.g., a given third-party computing device may be promoted or demoted if declined by the calling party). The server computing device may then select a next third-party computing device in the ordered list in block 410 and proceed as described above with reference to FIG. 4A.

FIG. 4C illustrates an embodiment method 470 that may be performed by a server computing device. The method 470 is similar to the methods 400, 450 described above, except the method 470 includes operations for enabling the called party via a third-party computing device to enter authentication information prior to accepting a call via a call request notification, thus ensuring privacy of the calling party and providing an opportunity for the called party to receive more information before accepting (or rejecting) a call.

The operations in blocks 402-412 may be performed by the processor of the server computing device as described above with reference to FIG. 4A. In block 472, the processor of the server computing device may transmit to the selected third-party computing device the generated call request notification with presentation info and an authentication challenge (e.g., a PIN prompt) based on the stored profile data of called party and/or calling party. In other words, the server computing device may combine the operations of blocks 414 and 418 as described above with reference to FIG. 4A in order to transmit the initial presentation information and authentication challenge at the same time to the called party using the selected third-party computing device.

As described above, in determination block 420 the server computing device may determine whether a correct challenge answer is received, such as via a received message or signal from the selected third-party computing device, and in response to determining that a correct answer is received (i.e., determination block 420="Yes"), the server computing device may transmit the complete presentation information about the call request (e.g., the calling party identity, the topic of the call request, the call media type, etc.) in block 422. The server computing device may determine whether a subsequent call acceptance message is received from the selected third-party computing device in determination block 416'.

In response to the server computing device determining that the call is not accepted by the called party at the selected third-party computing device (i.e., determination block 416'="No"), the server computing device may continue with the operations in optional block 417 or alternatively with the operations in block 404. However, in response to the server computing device determining that the call is accepted by the called party at the selected third-party computing device (i.e., determination block 416'="Yes"), the server computing device may continue with the operations in block 424 for initiating and administering the call until it is ended as described above with reference to FIG. 4A.

Figure 5:
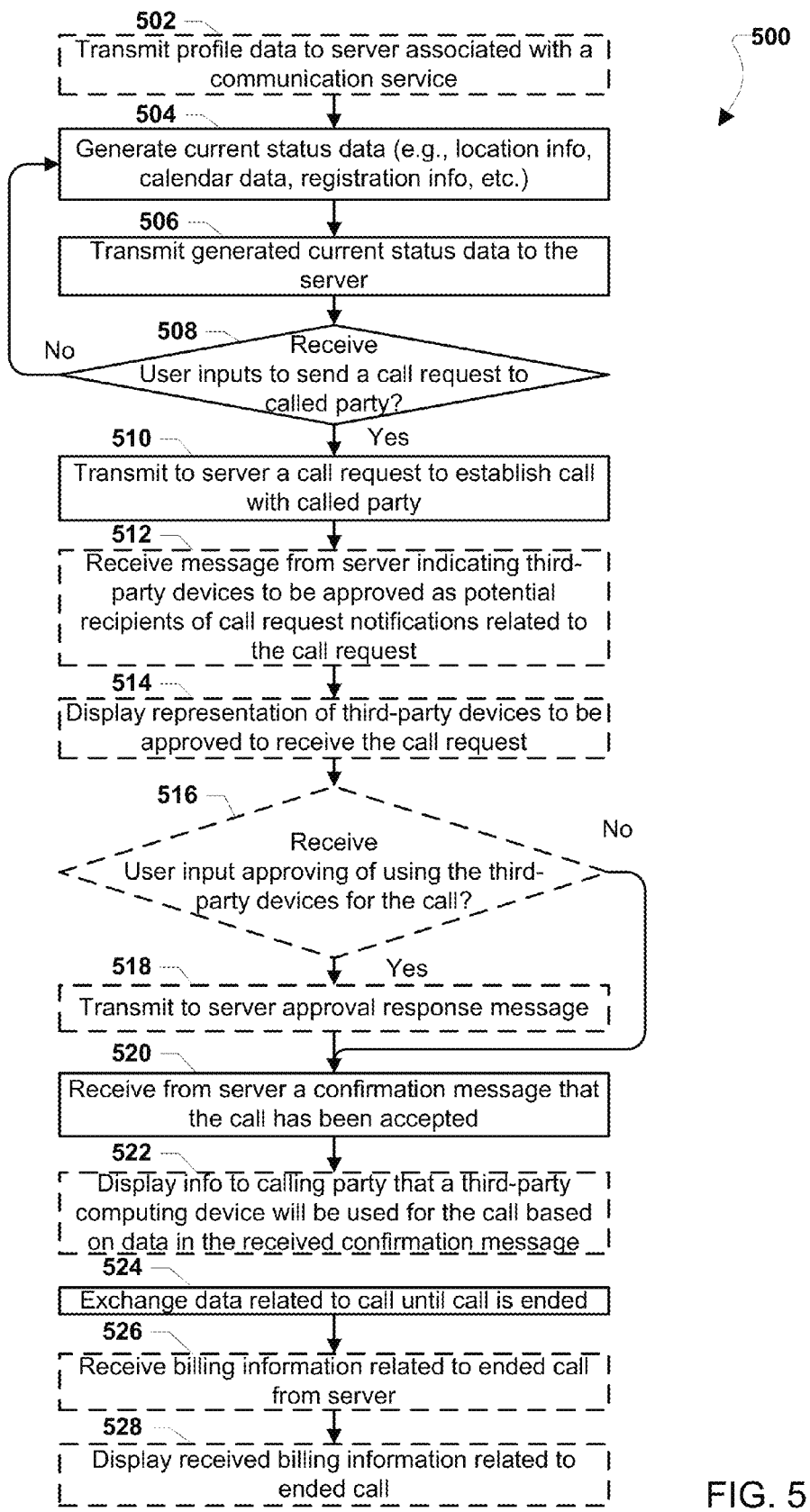
FIG. 5 is a process flow diagram illustrating an embodiment method for a calling party computing device to approve a call to be initiated with a third-party computing device utilized by a called party.

FIG. 5 illustrates an embodiment method 500 for a calling party computing device to approve a call associated with a communication service to be initiated with a third-party computing device utilized by a called party. For the purpose of simplicity, the method 500 may be described below as being performed by a calling party computing device, however it should be appreciated that any computing device used by a registered user of the communication service may perform the method 500.

In optional block 502, the processor of the calling party computing device may transmit profile data to a server computing device associated with the communication service. For example, the calling party computing device may be used by the calling party to access a web portal and register with the communication service, thereby transmitting personal information to the server computing device for storage within the calling party's profile. In various embodiments, other devices used by the calling party may be used to transmit profile data to the server computing device, such as a laptop, desktop, or other computing device capable of communicating over the Internet with the server computing device associated with the communication service.

In block 504, the processor of the calling party computing device may generate current status data, such as location information (e.g., GPS coordinates, etc.), scheduling information (e.g., calendar data of scheduled events, etc.), and computing device registration information (e.g., current IP address, SSID, etc.). For example, based on signals periodically received from an overhead GPS satellite, the calling party computing device may identify current GPS coordinates that may be transmitted to the server computing device for storage in the calling party's profile. As another example, the calling party computing device may obtain sensor data from an accelerometer sensor within the device that indicates the calling party is carrying the calling party computing device.

In various embodiments, the calling party computing device may perform the operations in block 504 to generate current status data periodically on a set interval of time, or in response to detecting predetermined conditions or events. For example, current status data may be changed or updated in response to the calling party entering in a new meeting into a calendar. As another example, the current status data may be updated when the calling party computing device switches local area network or wide area network access points.

In block 506, the processor of the calling party computing device may transmit the generated current status data to the server computing device associated with the communication service, such as by sending a packet formatted for use by the server computing device that includes the calling party identity as well as a payload of location, registration, and other information describing the operating conditions or states of the calling party computing device at a given time.

In determination block 508, the processor of the calling party computing device may determine whether user inputs to send a call request to a called party are received. The user inputs may be inputs corresponding to an application (or app) associated with the communication service, such as touch, voice, and/or mouse inputs accessing entries in an address book or contact listing. For example, the calling party computing device may determine whether touch inputs on a touch screen of the computing device are detected that coincide with a PTT application and the contact information (e.g., username, picture, phone number, etc.) for a called party. In response to the processor of the calling party computing device determining that the user inputs to send a call request to the called party are not received (i.e., determination block 508="No"), the calling party computing device may continue generating new current status data in block 504 as described above.

In response to the processor of the calling party computing device determining that the user inputs to send a call request to the called party are received (i.e., determination block 508="Yes"), the processor of the calling party computing device may transmit to the server computing device associated with the communication service a call request to establish a call with a computing device of the called party in block 510. For example, the calling party computing device may transmit a signal to the server computing device indicating the calling party desires to establish a PTT communication session or VOIP call with the called party.

In optional block 512, the processor of the calling party computing device may receive a message from the server computing device indicating third-party computing devices to be approved as potential recipients of call request notifications for related to the call, such as an ordered list of potential third-party computing devices that may be used to contact the called party when otherwise unreachable as described above. For example, the received message may include a list of smartphones near the called party's last known location.

In optional block 514, the processor of the calling party computing device may display a representation of the third-party computing devices to be approved to receive the call request. The received message may include generic or non-descriptive information about the potential third-party computing devices based on their respective privacy preferences or permission settings stored within their profiles on the server computing device. For example, one or more of a list of potential third-party computing devices indicated within the received message may be identified only as available smartphones capable of receiving the call request. Thus, the displayed representation may include various levels of details (e.g., phone numbers, user names, device types, etc.) of the potential third-party computing devices. In an embodiment, the calling party computing device may receive specific or otherwise identifying information about third-party computing devices that are both potential recipients for the call request and already known to the calling party.

In optional determination block 516, the processor of the calling party computing device may determine whether any user inputs are received that approve of using the third-party computing devices for the call. Such inputs may indicate whether some, all, or none of the third-party computing devices indicated in the received message from the server are accepted or rejected as potential recipients of call request notifications related to the call request. For example, the calling party computing device may detect touch inputs on individual elements of the displayed representation to approve or reject individual third-party computing devices as potential destinations for re-routing the call for the called party. In an embodiment, user inputs may be received that re-order or otherwise change the priority of the third-party computing devices indicated in the message received from the server computing device. For example, the calling party may provide inputs that switch the priority of smartphones indicated to be nearby the last known location of the called party's smartphone.

In response to the processor of the calling party computing device determining that it has received user inputs indicating an approval of third-party computing devices to be used to receive the call for the called party (i.e., optional determination block 516="Yes"), the processor of the calling party computing device may transmit to the server computing device an approval response message in optional block 518, such as a message that includes a code or other information indicating the calling party has approved of at least one third-party computing device to receive a call request notification related to the call request. As described above with reference to FIG. 4B in determination block 454 the approval response message may indicate that all of the potential third-party computing devices are authorized or approved to receive the call request, or alternatively that only a subset of the devices may be used for re-routing the call to the called party. In this way, the calling party may discover the list of the third-party computing devices that may be used for the call, but may also cause the server computing device to update its ordered list.

In response to the processor of the calling party computing device determining that it has not received user inputs indicating an approval of third-party computing devices to be used to receive the call for the called party (i.e., optional determination block 516="No"), or if the operations in optional block 518 are performed, the processor of the calling party computing device may receive from the server computing device a confirmation message that the call has been accepted in block 520, such as a signal that indicates the called party has been authenticated on a third-party computing device and thus the calling party computing device may begin transmitting data related to the requested call. Alternatively, the confirmation message may indicate the called party has accepted the call on his/her own computing device (i.e., no re-routing operations were needed due to the called party being reachable).

In an embodiment, when the calling party decides to not utilize any of the potential third-party computing devices, the calling party computing device may receive user inputs indicating that no third-party computing devices may be used to re-route the call. In this case, the calling party computing device may transmit an approval response message that rejects the use of re-routing or that is otherwise empty, and thus may not receive a subsequent confirmation message from the server computing device indicating the call has been accepted or otherwise established via a third-party computing device. In this way, a calling party may avoid re-routing his/her call and further may avoid being charged a fee or bill for utilizing the server computing device-enabled call re-routing.

In optional block 522, the processor of the calling party computing device may display information to the calling party that a third-party computing device will be used for the call based on data within the received confirmation message. For example, the displayed message may indicate that the call is being conducted over a third-party computing device and/or that the called party has been authenticated based on an entered PM.

In block 524, the processor of the calling party computing device may exchange data related to the call until the call is ended, such as by transmitting video and/or voice data during a video chat with the called party via an application associated with the communication service. As described above, this exchange may continue until the calling party and/or the called party ends the call, or the connection is otherwise lost (e.g., due to bad signal strength, etc.).

In optional block 526, the processor of the calling party computing device may receive from the server computing device billing information related to the ended call, such as notifications of charges or fees incurred as a result of utilizing a third-party computing device to conduct the call with the called party. For example, the calling party computing device may receive a message indicating that the calling party's cellular network account may be billed a flat fee or a pro rata amount for data transfers or a duration of network usage related to the ended call.

In optional block 528, the processor of the calling party computing device may display the received billing information related to the ended call, such as by rendering a prompt, pop-up dialog box, or other indicator within an application associated with the communication service. It should be appreciated that the operations in optional blocks 512-518, 522, 526, 528 may be optional as at any given time the called party may or may not be reachable on his/her own device for the call, and these optional operations may only be required when call re-routing is needed.

Figure 6A:
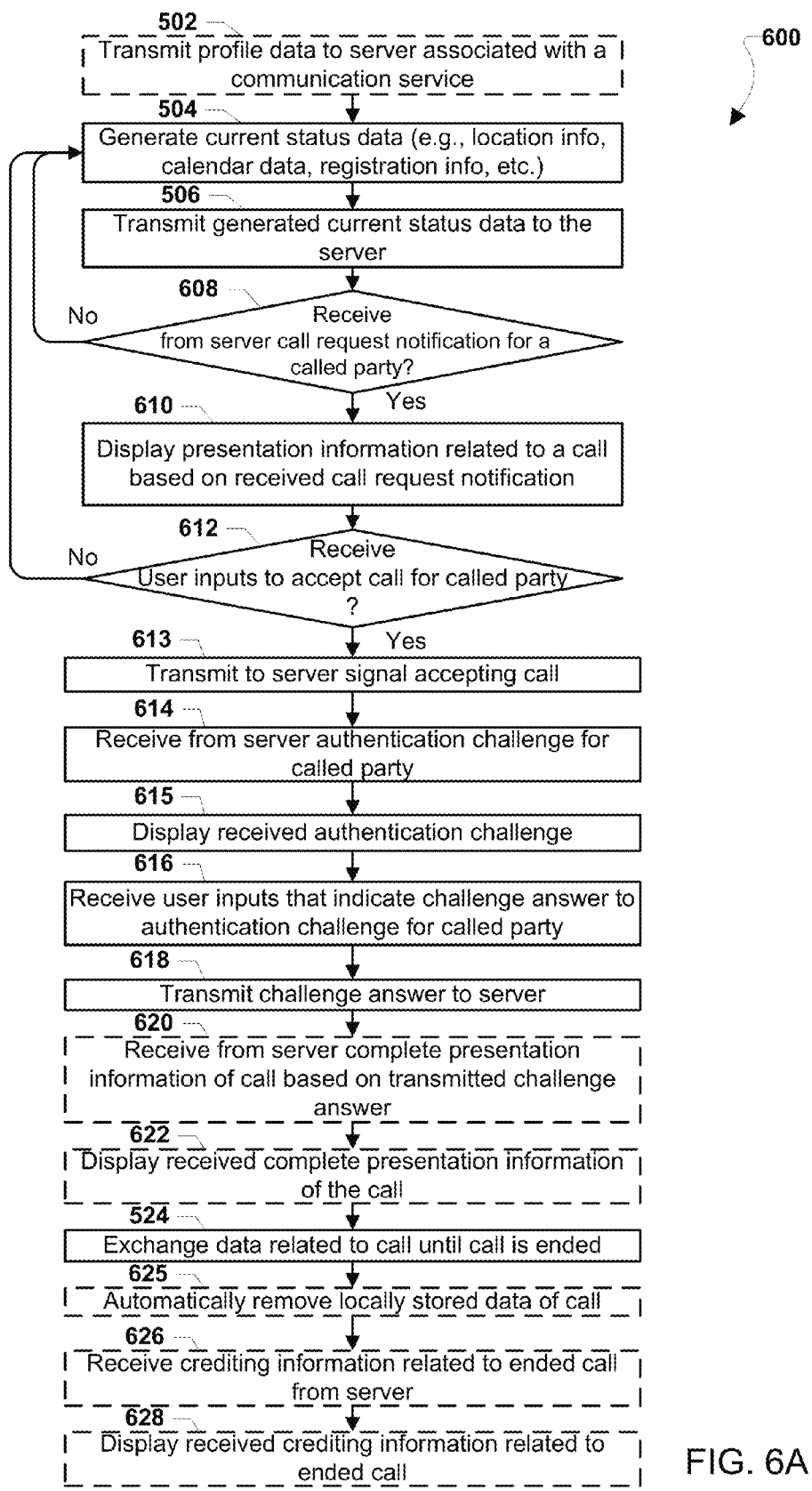
FIGS. 6A-6B are process flow diagrams illustrating embodiment methods for a third-party computing device to accept a call from a calling party to a called party.
Figure 6B:
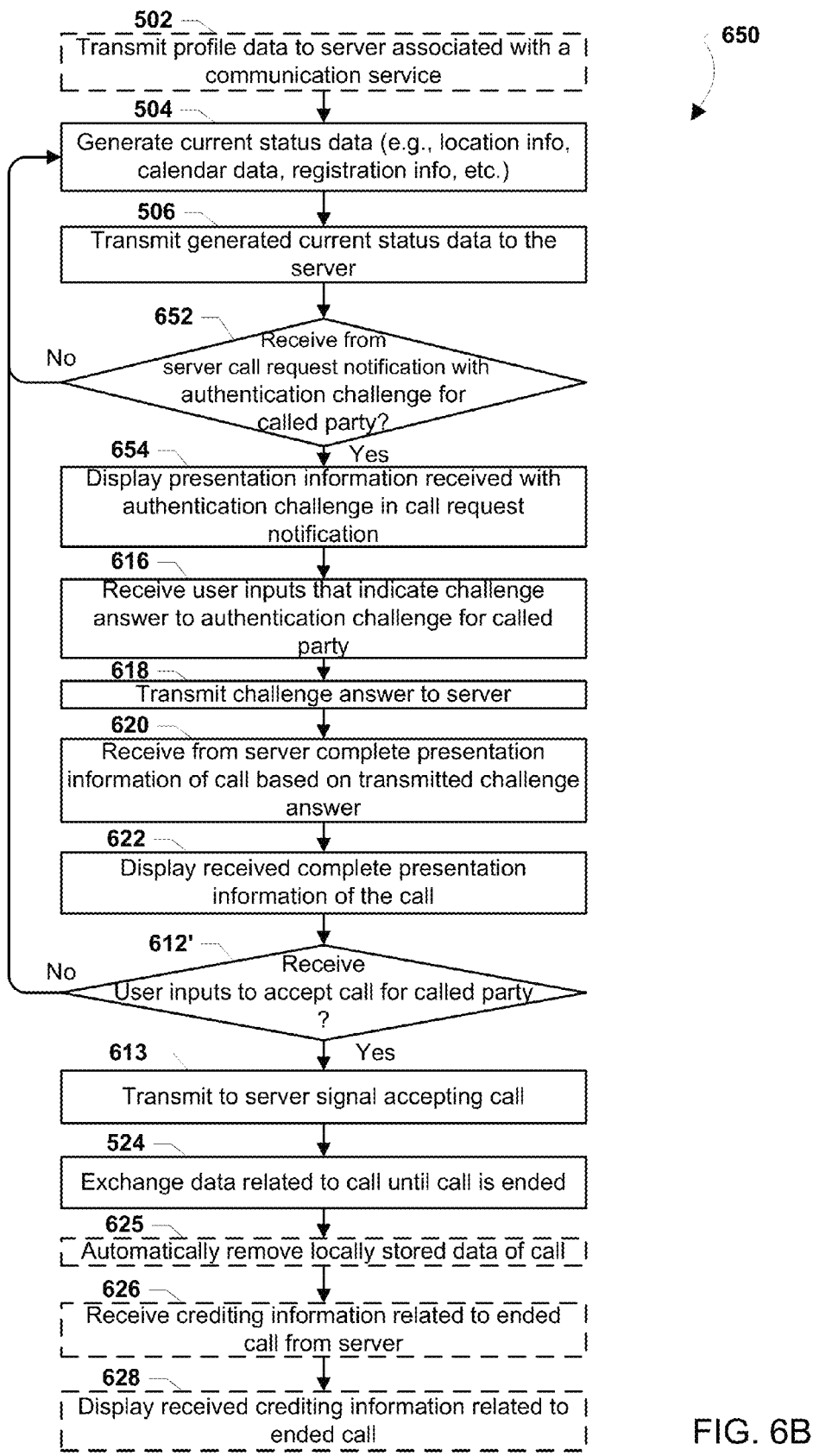

FIGS. 6A-6B illustrate embodiment methods 600, 650 for a third-party computing device to accept a call from a calling party to a called party when the called party is unreachable on a communication service via his/her own computing device. The methods 600, 650 may be performed by a third-party computing device that has been determined to be appropriate for receiving the re-routed call (e.g., VOIP call, PTT communication, etc.) from the calling party. For example, the third-party computing device may be determined by a server to be the closest device to the called party's last known location based on GPS coordinates. For the purpose of simplicity, the methods 600, 650 may be described below as being performed by a third-party computing device; however it should be appreciated that any computing device associated with a registered user of a communication service may perform the methods 600, 650.

With reference to FIG. 6A, the processor of the third-party computing device may be configured to perform the operations in blocks 502-506 as described above with reference to FIG. 5. In determination block 608, the processor of the third-party computing device may determine whether a call request notification for a called party is received from the server computing device associated with the communication service. For example, the third-party computing device may monitor an incoming message buffer and identify received messages that include a code or other data that indicates a request to re-route a call for the called party. In response to the processor of the third-party party computing device determining that the call request notification has not been received (i.e., determination block 608="No"), the third-party computing device may continue generating new current status data in block 504 as described above.

In response to the processor of the third-party party computing device determining that the call request notification has been received (i.e., determination block 608="Yes"), the processor of the third-party computing device may display presentation information related to a call intended for the called party based on the received call request notification in block 610. Examples of such displayed presentation information are described above with reference to FIGS. 2A-2D. For example, the third-party computing device may render a pop-up dialog box or window that includes a description of the type of call and the identity of the called party.

In determination block 612, the processor of the third-party computing device may determine whether user inputs are received that accepts the call for the called party. For example, the third-party computing device may detect touch inputs on a touch screen that coincide with an "Accept" (or "reject") graphical user interface button as described above with reference to FIG. 3A. In response to determining that user inputs to accept the call for the called party are not received (i.e., determination block 612="No"), the third-party computing device may continue generating new current status data in block 504 as described above.

In response to determining that user inputs are received that accept the call for the called party (i.e., determination block 612="Yes"), the processor of the third-party computing device may transmit to the server computing device associated with the communication service a signal accepting the call in block 613, and may receive from the server computing device an authentication challenge for the called party in block 614. As described above, the authentication challenge may be a prompt for the called party to provide information (e.g., a PIN) that proves his/her identity prior to the server computing device transmitting any sensitive data related to the call, such as the calling party's identity, the topic of the call, etc.

In block 615, the processor of the third-party computing device may display the received authentication challenge, such as illustrated above in FIG. 3B as a rendered prompt for the called party to enter a PIN via a graphical user interface. In block 616, the processor of the third-party computing device may receive user inputs that indicate a challenge answer to the authentication challenge for the called party. For example, the received inputs may be keypad inputs that represent a PIN. In block 618, the processor of the third-party computing device may transmit the challenge answer to the server computing device associated with the communication service.

In optional block 620, the processor of the third-party computing device may receive from the server computing device complete presentation information of the call based on the transmitted challenge answer. The complete presentation information may include information that was obscured or otherwise not included within the call request notification due to privacy concerns and/or preference settings within the profiles of the calling party and/or the called party. For example, the complete presentation information may include the calling party's actual name and phone number as well as picture. In optional block 622, the processor of the third-party computing device may display the received complete presentation information of the call, such as by rendering the complete presentation information within an application interface associated with the communication service.

As described above, in block 524, the processor of the third-party computing device may exchange data related to the call with the calling party until the call is ended. In optional block 625, the processor of the third-party computing device may automatically remove locally stored data related to the call. In particular, when video, text, audio, or other data is stored within a local cache, memory, or storage unit of the third-party computing device during the execution of the operations of block 524, the third-party computing device may delete, flush, or otherwise invalidate that data to ensure privacy of the calling party and/or the called party.

In optional block 626, the processor of the third-party computing device may receive from the server computing device associated with the communication service crediting information related to the ended call. As described above, the server computing device may calculate rewards or other compensation for the user of the third-party computing device based on the ended call, such as a reimbursement for data charges incurred due to receiving the call for the called party. In optional block 628, the processor of the third-party computing device may display the received crediting information related to the ended call, such as by rendering a graphical user interface element or window with text indicating a reward or reimbursement has been assigned to the third-party computing device (or its owner).

FIG. 6B illustrates another embodiment method 650 for a third-party computing device to accept a call from a calling party to a called party when the called party is unreachable on a communication service via his/her own computing device. The method 650 is similar to the method 600 described above, except that the method 650 may include operations for the third-party computing device to receive user inputs that authenticate the called party prior to accepting the call. In other words, the called party may enter in a PIN or other authentication information in order to see protected or sensitive information about the call requested by the calling party that may be used by the called party to decide whether or not to participate in the call.

The operations in blocks 502-506 may be performed by the processor of the third-party computing device as described above. In determination block 652, the processor of the third-party computing device may determine whether a call request notification that includes an authentication challenge for the called party is received from the server computing device associated with the communication service. The third-party computing device may evaluate incoming messages to determine whether any received messages include data, codes, or other information that represent a call request and an authentication challenge, such as a PIN prompt. In response to the processor of the third-party party computing device determining that a call request notification that includes an authentication challenge for the called party is not received (i.e., determination block 652="No"), the third-party computing device may continue generating new current status data in block 504 as described above.

In response to the processor of the third-party party computing device determining that a call request notification that includes an authentication challenge for the called party is received (i.e., determination block 652="Yes"), in block 654 the processor of the third-party computing device may display presentation information received with the authentication challenge within the received call request notification, such as by rendering information both a message indicating the called party and prompting a PIN to be entered. The processor of the third-party computing device may perform operations in block 616-622 as described above.

In determination block 612', the processor of the third-party computing device may determine whether user inputs are received that accept the call for the called party. The operations in determination block 612' may be similar to those of determination block 612 described above, except that the operations in determination block 612' may be performed after the called party has already entered a correct authentication challenge answer.

In response to determining that user inputs are received that do not accept the call (i.e., determination block 612'="No"), the processor of the third-party computing device may continue generating new current status data in block 504. However, in response to determining that user inputs are received that accept the call (i.e., determination block 612'="Yes"), the processor of the third-party computing device may transmit a signal accepting the call in block 613 as described above. The third-party computing device may also perform the operations of blocks 524, 625-628 as described above with reference to FIG. 6A.

Figure 7A:
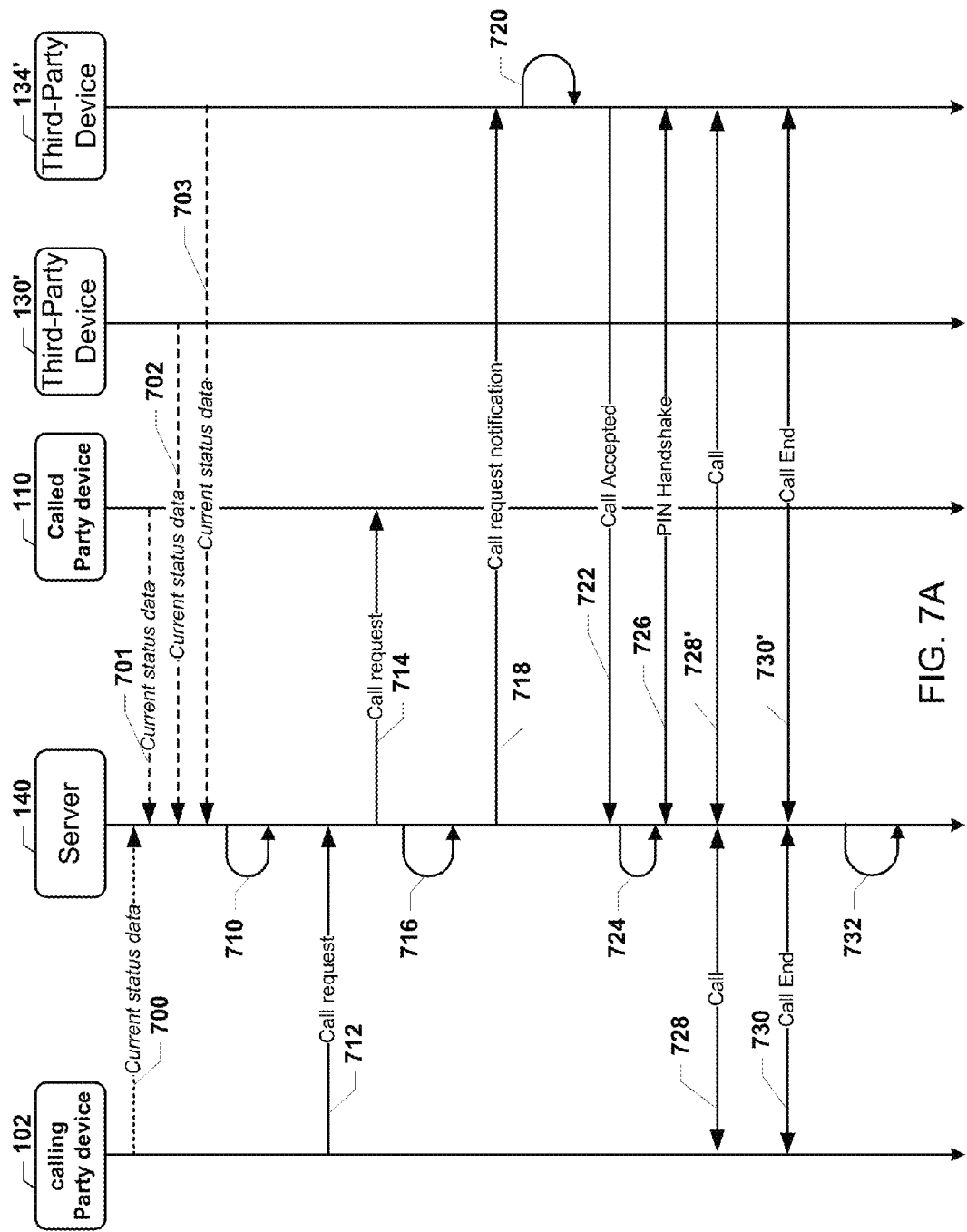
FIGS. 7A-7B are call flow diagrams illustrating signaling between a calling party computing device, a called party computing device, third-party computing devices, and a server computing device suitable according to an embodiment.
Figure 7B:
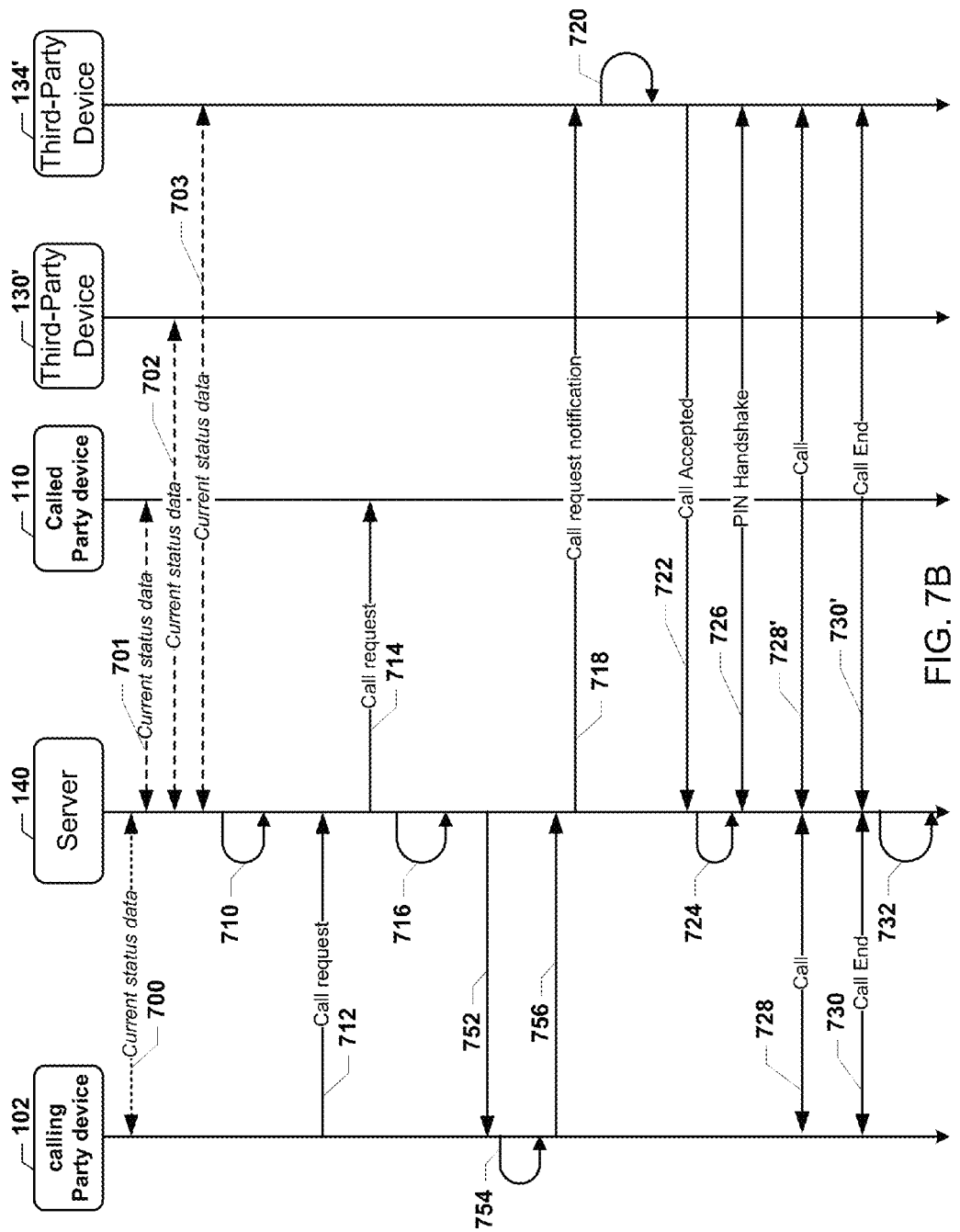

FIGS. 7A-7B illustrate signaling between a calling party computing device 102, a called party computing device 110, third-party computing devices 130', 134', and a server computing device 140 associated with a communication service suitable for use in various embodiments. In FIG. 7A, the calling party computing device 102, the called party computing device 110, and the third-party computing devices 130', 134' may transmit to the server computing device 140 current status data (e.g., location information, computing device registration information, scheduling information/calendar data, etc.) via signals 700, 701, 702, 703, respectively. As described above, such signals 700, 701, 702, 703 may be periodic or transmitted in response to the occurrence of an event. Further, the server computing device 140 may be configured to perform operations 710 based on receiving the signals 700, 701, 702, 703, such as evaluating and storing status data within user profiles. In an embodiment, the operations 710 may also include operations for the server computing device 140 to identify potential devices for receiving re-routed calls for registered users of the communication service, such as those users who opted-in to the re-routing functionality or program of the communication service. As described above, the operations of identifying potential third-party computing devices may be performed by the server computing device 140 periodically or in response to an event, such as the receipt of a call request from a calling party.

To establish a call (e.g., VOIP call, rich media call, etc.) with the called party associated with the called party computing device 110, the calling party computing device 102 may transmit a call request signal 712 (or call request message) that is received by the server computing device 140. In response, the server computing device 140 may re-transmit or otherwise relay the information within the received call request via a signal 714 to the called party computing device 110 indicated by the call request.

The server computing device 140 may perform operations 716 to determine whether a response from the called party computing device 110 is received in response to the call request indicated in the signal 714. The operations 716 may include operations for detecting the expiration of a timer (e.g., a time-to-live or timeout timer, etc.) which may indicate that the called party has not responded within a predetermined tolerance time period. The operations 716 may further include operations for identifying potential third-party computing devices for receiving the call from the calling party when re-routed by the server computing device 140. In an embodiment, the operations 716 may include compiling or generating for a first time, or updating a pre-existing, ordered list of potential third-party computing devices that may receive the call for the called party when he/she is unreachable on the called party computing device 110. The operations 716 may also include identifying information for a call request notification, such as presentation information based on privacy settings or preferences within the profiles of the called party and/or the calling party.

The server computing device 140 may transmit a call request notification signal 718 (or call request notification message) to a first third-party computing device 134'. For example, the call request notification signal 718 may include presentation information that indicates the called party identity, the calling party identity, a call mode (e.g., private), but that does not include (or redacts) information indicating the call type or call media. The first third-party computing device 134' may perform operations 720 in response to receiving the call request notification signal 718, such as rendering presentation information and receiving user inputs for accepting the call. The first third-party computing device 134' may transmit to the server computing device 140 a signal 722 indicating the call has been accepted by the called party, and in response, the server computing device 140 may perform operations 724, such as identifying an authentication challenge. The server computing device 140 and the first third-party computing device 134' may exchange signals 726, such as signals for executing a PIN handshake (i.e., transmitting an authentication challenge answer via an authentication answer message and related confirmation, etc.).

In response to a successful authentication via the signals 726, the call may be initiated and begin. Accordingly, signals 728 and 728' may be exchanged between the calling party computing device 102 and the server computing device 140 and the third-party computing device 134' and the server computing device 140, respectively. With these signal exchanges, sensitive, redacted, or otherwise protected content or information related to the call may be made available to the third-party computing device 134'. At the end of the call, subsequent signals 730 and 730' may be exchanged between the calling party computing device 102 and the server computing device 140 and the third-party computing device 134' and the server computing device 140, respectively. The server computing device 140 may perform operations 732 for processing billing and/or crediting information related to the ended call, such as applying credits to an account or profile of the user of the third-party computing device 134' and charges or fees to the account of the called party and/or the calling party.

FIG. 7B illustrates signaling between a calling party computing device 102, a called party computing device 110, third-party computing devices 130', 134', and a server computing device 140 suitable for use in various embodiments. The signaling and operations of FIG. 7B are similar to the signaling and operations of FIG. 7A, except that FIG. 7B also includes signaling and operations between the server computing device 140 and the calling party computing device 102 to approve of potential third-party computing devices that may receive call request notifications related to a call request unanswered at the called party computing device 110. In particular, once an ordered list of potential third-party computing devices has been identified related to a call request for the called party, the server computing device 140 may transmit a signal 752 to the calling party computing device 102 that includes a representation of the ordered list for approval by the calling party. In response, the calling party computing device may perform operations 754 for processing the signal 752, such as receiving user inputs that indicate whether the calling party approves, rejects, and/or re-orders devices in the list for receiving the call request notification. The calling party computing device 102 may transmit an approval response message 756 (or approval response signal) indicating the approval or rejection of such potential third-party computing devices, such as a re-ordered list or an abbreviated list. The subsequently transmitted call request notification signal 718 may be based on the approval response message 756.

Figure 8:
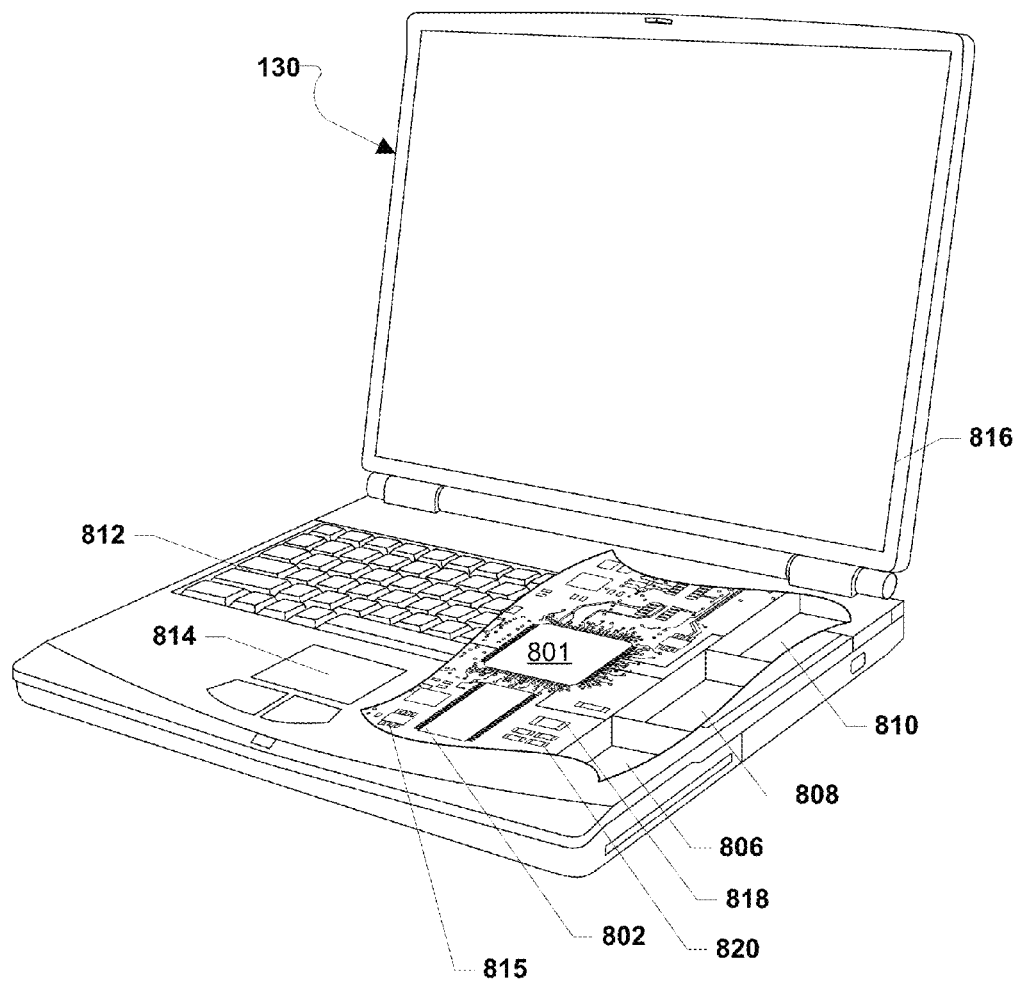
FIG. 8 is a component block diagram of an example laptop computing device suitable for use with the various embodiments.

Various forms of computing devices, including personal computers and laptop computers, may be used to implementing the various embodiments. Such computing devices typically include the components illustrated in FIG. 8 which illustrates an example laptop computing device 130. Many laptop computing devices 130 include a touch pad touch surface 814 that serves as the computer's pointing computing device, and thus may receive drag, scroll, and flick gestures similar to those implemented on computing devices equipped with a touch screen display. Such a laptop computing device 130 may generally include a processor 801 coupled to volatile internal memory 802 and a large capacity nonvolatile memory, such as a disk drive 806. The laptop computing device 130 may also include a compact disc (CD) and/or DVD drive 808 coupled to the processor 801. The laptop computing device 130 may also include a number of connector ports 810 coupled to the processor 801 for establishing data connections or receiving external memory computing devices, such as a network connection circuit for coupling the processor 801 to a network. The laptop computing device 130 may have one or more short-range radio signal transceivers 818 (e.g., Peanut®, Bluetooth®, Zigbee®, Wi-Fi, RF radio) and antennas 820 for sending and receiving wireless signals as described herein. The transceivers 818 and antennas 820 may be used with the above-mentioned circuitry to implement the various wireless transmission protocol stacks/interfaces. In a laptop or notebook configuration, the computer housing may include the touch pad touch surface 814, the keyboard 812, and the display 816 all coupled to the processor 801. Other configurations of the laptop computing device 130 may include a computer mouse or trackball coupled to the processor (e.g., via a USB input) as are well known, which may also be used in conjunction with the various embodiments. Additionally, the laptop computing device 130 may include a GPS receiver chip 815 coupled to the processor 801.

Figure 9:
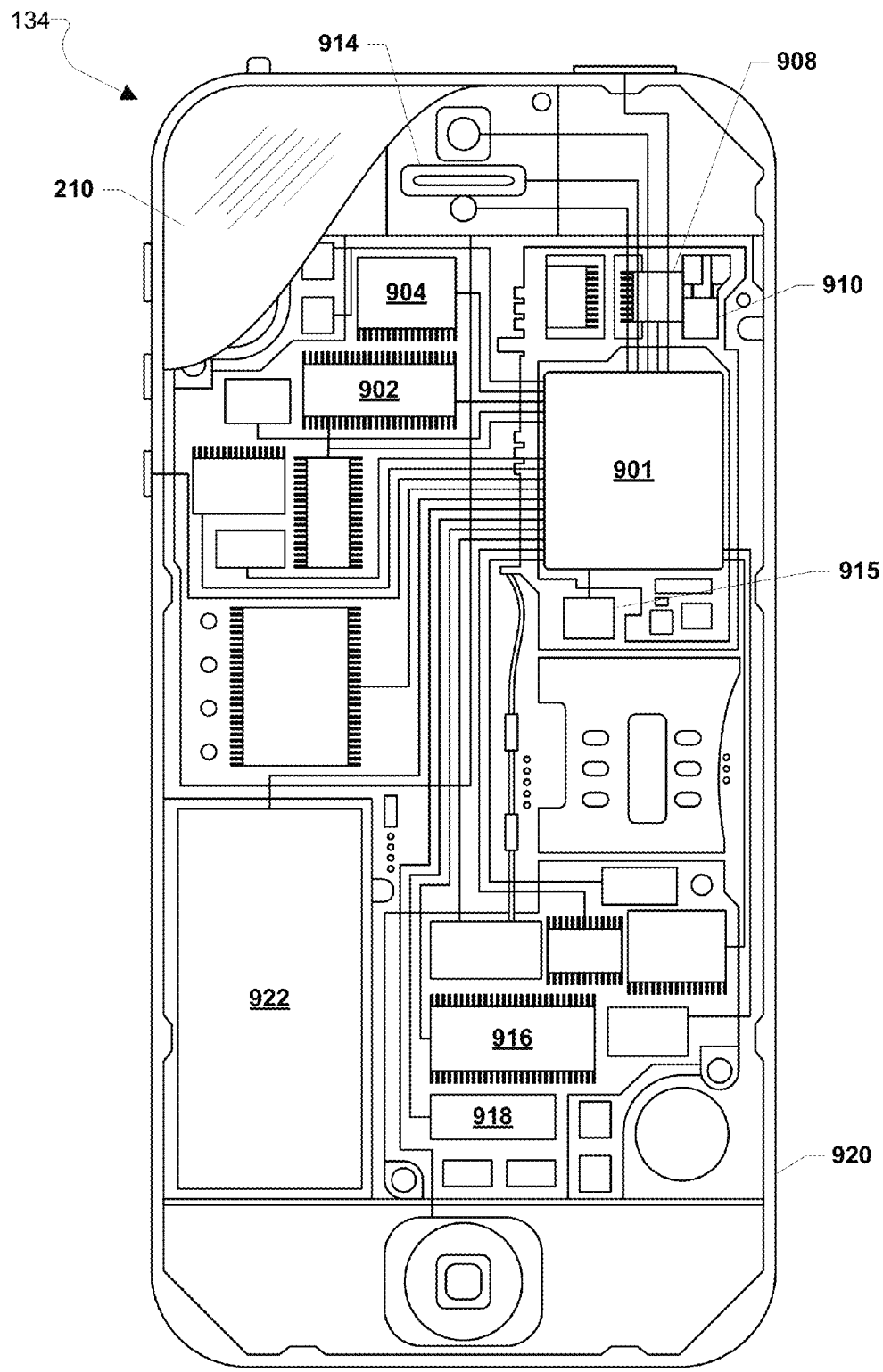
FIG. 9 is a component block diagram of a computing device suitable for use in various embodiments.

FIG. 9 illustrates an embodiment computing device 134. In various embodiments, the computing device 134 may include a processor 901 coupled to a touch screen controller 904 and an internal memory 902. The processor 901 may be one or more multicore ICs designated for general or specific processing tasks. The internal memory 902 may be volatile or non-volatile memory, and may also be secure and/or encrypted memory, or unsecure and/or unencrypted memory, or any combination thereof. The touch screen controller 904 and the processor 901 may also be coupled to a touch screen panel 210, such as a resistive-sensing touch screen, capacitive-sensing touch screen, infrared sensing touch screen, etc.

The computing device 134 may have one or more radio signal transceivers 908 (e.g., Peanut®, Bluetooth®, Zigbee®, Wi-Fi, RF radio) and antennae 910, for sending and receiving, coupled to each other and/or to the processor 901. The transceivers 908 and antennae 910 may be used with the above-mentioned circuitry to implement the various wireless transmission protocol stacks and interfaces. The computing device 134 may include a cellular network wireless modem chip 916 that enables communication via a cellular network and is coupled to the processor.

The computing device 134 may include a peripheral computing device connection interface 918 coupled to the processor 901. The peripheral computing device connection interface 918 may be singularly configured to accept one type of connection, or multiply configured to accept various types of physical and communication connections, common or proprietary, such as USB, FireWire, Thunderbolt, or PCIe. The peripheral computing device connection interface 918 may also be coupled to a similarly configured peripheral computing device connection port (not shown).

The computing device 134 may also include speakers 914 for providing audio outputs. The computing device 134 may also include a housing 920, constructed of a plastic, metal, or a combination of materials, for containing all or some of the components discussed herein. The computing device 134 may include a power source 922 coupled to the processor 901, such as a disposable or rechargeable battery. The rechargeable battery may also be coupled to the peripheral computing device connection port to receive a charging current from a source external to the computing device 134. Additionally, the computing device 134 may include a GPS receiver chip 915 coupled to the processor 901.

Figure 10:
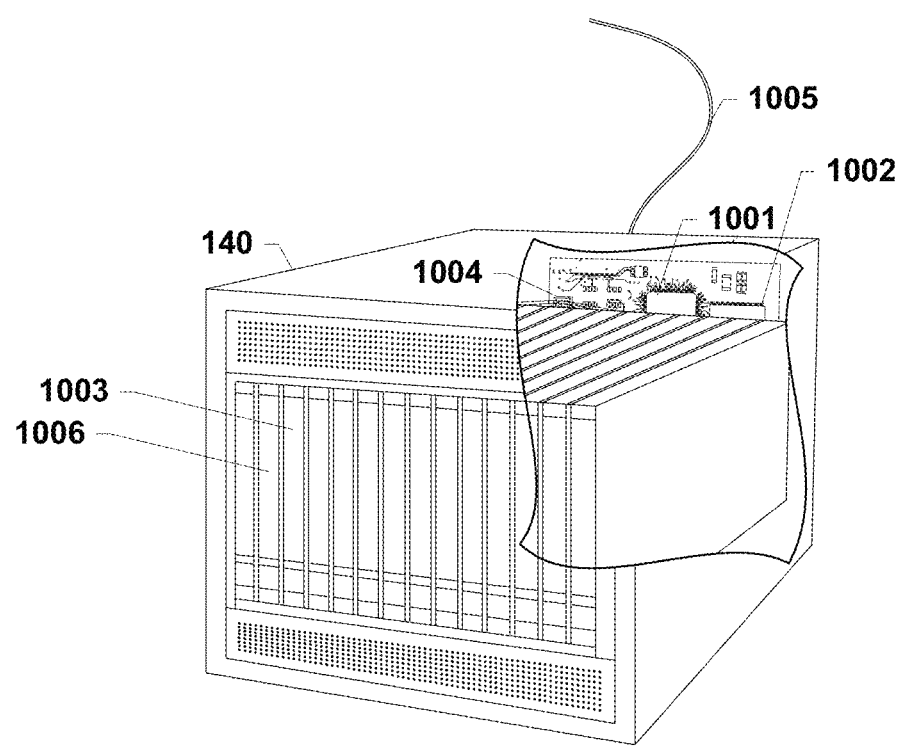
FIG. 10 is a component block diagram of a server computing device suitable for use in various embodiments.

The various embodiments may be implemented on any of a variety of commercially available server computing devices, such as the server computing device 140 illustrated in FIG. 10. Such a server computing device 140 may typically include a processor 1001 coupled to volatile memory 1002 and a large capacity nonvolatile memory, such as a disk drive 1003. The server computing device 140 may also include a floppy disc drive, compact disc (CD) or DVD disc drive 1006 coupled to the processor 1001. The server computing device 140 may also include network access ports 1004 coupled to the processor 1001 for establishing data connections with a network 1005, such as a local area network coupled to other system computers and server computing devices.

The processors 801, 901, and 1001 may be any programmable microprocessor, microcomputer or multiple processor chip or chips that can be configured by software instructions (applications) to perform a variety of functions, including the functions of the various embodiments described above. In the various computing devices, multiple processors may be provided, such as one processor dedicated to wireless communication functions and one processor dedicated to running other applications. Typically, software applications may be stored in the internal memory 802, 902, and 1002 before they are accessed and loaded into the processors 801, 901, and 1001. The processors 801, 901, and 1001 may include internal memory sufficient to store the application software instructions. In many computing devices the internal memory may be a volatile or nonvolatile memory, such as flash memory, or a mixture of both. For the purposes of this description, a general reference to memory refers to memory accessible by the processors 801, 901, and 1001 including internal memory or removable memory plugged into the various computing devices and memory within the processors 801, 901, and 1001.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic computing device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable or server-executable software module or processor- or server-executable software instructions which may reside on a non-transitory computer-readable storage medium, a non-transitory server-readable storage medium, and/or a non-transitory processor-readable storage medium. Non-transitory server-readable storage media may be any available media that may be accessed by a server computing device. By way of example, and not limitation, such non-transitory server-readable and processor-readable media may comprise RAM, ROM, EEPROM, CD-ROM or other optical disk storage, magnetic disk storage or other magnetic storage computing devices, or any other medium that may be used to store desired program code in the form of instructions or data structures and that may be accessed by a computing device. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory server-readable and processor-readable media. Additionally, the operations of a method or algorithm may reside as one or any combination or set of codes and/or instructions on a non-transitory processor-readable storage medium and/or server-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a server computing device associated with a communication service to route a communication from a calling party for a called party to a device of a third-party within a plurality of third-parties when the called party is unreachable at his/her own device, comprising:
    obtaining current status data from a plurality of computing devices for storage within profiles of registered users of the communication service, the registered users including at least the calling party, the called party, and the plurality of third-parties;
    determining whether the called party is unreachable based on an unanswered call request for the communication from a calling party computing device;
    generating an ordered list of potential third-party computing devices associated with the plurality of third-parties based on the unanswered call request for the communication, the profiles of the registered users, and the obtained current status data in response to determining that the called party is unreachable on his/her own device;
    selecting a third-party computing device from the ordered list of potential third-party computing devices;
    transmitting a call request notification to the selected third-party computing device;
    determining whether a call acceptance message is received from the selected third-party computing device;
    transmitting, to the selected third-party computing device, an authentication challenge for the called party to answer in response to receiving the call acceptance message from the selected third-party computing device;
    determining from an authentication answer message received from the selected third-party computing device whether the called party correctly answered the transmitted authentication challenge; and
    administering the communication between the calling party computing device and the selected third-party computing device in response to determining that the called party correctly answered the authentication challenge.

2. The method of claim 1, wherein the obtained current status data includes at least one of computing device location information, scheduling information, and computing device registration information.

3. The method of claim 1, wherein transmitting the call request notification to the selected third-party computing device comprises generating, based on the unanswered call request and the profiles of the registered users, the call request notification with presentation information that includes at least an identification of the called party.

4. The method of claim 1, wherein the authentication challenge for the called party is a prompt for at least one of a personal identity number (PIN), a biometric fingerprint scan, a spoken keyword, an iris scan, and an NFC tap.

5. The method of claim 1, further comprising:
    determining from the authentication answer message whether the called party correctly answered the authentication challenge but does not accept the communication;
    transmitting, to the selected third-party computing device, complete presentation information related to the unanswered call request that indicates at least an identification of the calling party in response to determining that the called party correctly answered the authentication challenge but does not accept the communication; and
    determining whether a message is received from the selected third-party computing device that accepts the communication after transmission of the complete presentation information related to the unanswered call request,
    wherein administering the communication between the calling party computing device and the selected third-party computing device in response to determining that the called party correctly answered the authentication challenge comprises administering the communication between the calling party computing device and the selected third-party computing device in response to determining the called party has correctly answered the authentication challenge and that the message is received that accepts the communication.

6. The method of claim 1, further comprising:
    transmitting to the calling party computing device a representation of the ordered list of potential third-party computing devices;
    receiving, from the calling party computing device, an approval response message in response to transmitting the representation; and
    revising the ordered list of potential third-party computing devices based on the received approval response message by at least one of reordering the ordered list of potential third-party computing devices and removing potential third-party computing devices from the ordered list of potential third-party computing devices, and
    wherein selecting the third-party computing device from the ordered list of potential third-party computing devices comprises selecting the third-party computing device from the revised list of potential third-party computing devices.

7. The method of claim 1, further comprising calculating at least one of billing information and crediting information based on the administered communication.

8. The method of claim 1, further comprising:
selecting another third-party computing device from the ordered list of potential third-party computing devices; and
transmitting the call request notification to the selected another third-party computing device in response to determining that the call acceptance message was not received from the selected third-party computing device.

9. A server computing device, comprising:
a network interface configured to communicate with a telecommunication network; and
a processor coupled to the network interface and configured with processor-executable instructions to perform operations comprising:
obtaining current status data from a plurality of computing devices for storage within profiles of registered users of a communication service, the registered users including at least a calling party, a called party, and a plurality of third-parties;
determining whether the called party is unreachable based on an unanswered call request for a communication from a calling party computing device;
generating an ordered list of potential third-party computing devices associated with the plurality of third-parties based on the unanswered call request for the communication, the profiles of the registered users, and the obtained current status data in response to determining the called party is unreachable on his/her own device;
selecting a third-party computing device from the ordered list of potential third-party computing devices;
transmitting a call request notification to the selected third-party computing device via the telecommunication network;
determining whether a call acceptance message is received from the selected third-party computing device;
transmitting an authentication challenge for the called party to answer to the selected third-party computing device via the telecommunication network in response to receiving the call acceptance message from the selected third-party computing device;
determining from an authentication answer message received from the selected third-party computing device whether the called party correctly answered the transmitted authentication challenge; and
administering the communication between the calling party computing device and the selected third-party computing device via the telecommunication network in response to determining that the called party correctly answered the authentication challenge.

10. The server computing device of claim 9, wherein the processor is configured with processor-executable instructions to perform operations such that the obtained current status data includes at least one of computing device location information, scheduling information, and computing device registration information.

11. The server computing device of claim 9, wherein the processor is configured with processor-executable instructions to perform operations such that transmitting the call request notification to the selected third-party computing device comprises generating, based on the unanswered call request and the profiles of the registered users, the call request notification with presentation information that includes at least an identification of the called party.

12. The server computing device of claim 9, wherein the processor is configured with processor-executable instructions to perform operations such that the authentication challenge for the called party is a prompt for at least one of a personal identity number (PIN), a biometric fingerprint scan, a spoken keyword, an iris scan, and an NFC tap.

13. The server computing device of claim 9, wherein the processor is configured with processor-executable instructions to perform operations further comprising:
determining from the authentication answer message whether the called party correctly answered the authentication challenge but does not accept the communication;
transmitting, to the selected third-party computing device via the telecommunication network, complete presentation information related to the unanswered call request that indicates at least an identification of the calling party in response to determining that the called party correctly answered the authentication challenge but does not accept the communication; and
determining whether a message is received from the selected third-party computing device that accepts the communication after transmission of the complete presentation information related to the unanswered call request,
wherein administering the communication between the calling party computing device and the selected third-party computing device via the telecommunication network in response to determining that the called party correctly answered the authentication challenge comprises administering the communication between the calling party computing device and the selected third-party computing device via the telecommunication network in response to determining the called party has correctly answered the authentication challenge and that the message is received that accepts the communication.

14. The server computing device of claim 9, wherein the processor is configured with processor-executable instructions to perform operations further comprising:
transmitting a representation of the ordered list of potential third-party computing devices to the calling party computing device via the telecommunication network;
receiving an approval response message from the calling party computing device via the telecommunication network in response to transmitting the representation; and
revising the ordered list of potential third-party computing devices based on the received approval response message by at least one of reordering the ordered list of potential third-party computing devices and removing items from the ordered list of potential third-party computing devices, and
wherein selecting the third-party computing device from the ordered list of potential third-party computing devices comprises selecting the third-party computing device from the revised list of potential third-party computing devices.

15. The server computing device of claim 9, wherein the processor is configured with processor-executable instructions to perform operations further comprising calculating at least one of billing information and crediting information based on the administered communication.

16. The server computing device of claim 9, wherein the processor is configured with processor-executable instructions to perform operations further comprising:
- selecting another third-party computing device from the ordered list of potential third-party computing devices; and
- transmitting the call request notification to the selected another third-party computing device via the telecommunication network in response to determining that the call acceptance message was not received from the selected third-party computing device.

17. A non-transitory server-readable storage medium having stored thereon server-executable instructions configured to cause a server computing device to perform operations comprising:
- obtaining current status data from a plurality of computing devices for storage within profiles of registered users of a communication service, the registered users including at least a calling party, a called party, and a plurality of third-parties;
- determining whether the called party is unreachable based on an unanswered call request for a communication from a calling party computing device;
- generating an ordered list of potential third-party computing devices associated with the plurality of third-parties based on the unanswered call request for the communication, the profiles of the registered users, and the obtained current status data in response to determining the called party is unreachable on his/her own device;
- selecting a third-party computing device from the ordered list of potential third-party computing devices;
- transmitting a call request notification to the selected third-party computing device;
- determining whether a call acceptance message is received from the selected third-party computing device;
- transmitting an authentication challenge for the called party to answer to the selected third-party computing device in response to receiving the call acceptance message from the selected third-party computing device;
- determining from an authentication answer message received from the selected third-party computing device whether the called party correctly answered the transmitted authentication challenge; and
- administering the communication between the calling party computing device and the selected third-party computing device in response to determining that the called party correctly answered the authentication challenge.

18. The non-transitory server-readable storage medium of claim 17, wherein the stored server-executable instructions are configured to cause the server computing device to perform operations such that the obtained current status data includes at least one of computing device location information, scheduling information, and computing device registration information.

19. The non-transitory server-readable storage medium of claim 17, wherein the stored server-executable instructions are configured to cause the server computing device to perform operations such that transmitting the call request notification to the selected third-party computing device comprises generating, based on the unanswered call request and the profiles of the registered users, the call request notification with presentation information that includes at least an identification of the called party.

20. The non-transitory server-readable storage medium of claim 17, wherein the stored server-executable instructions are configured to cause the server computing device to perform operations such that the authentication challenge for the called party is a prompt for at least one of a personal identity number (PIN), a biometric fingerprint scan, a spoken keyword, an iris scan, and an NFC tap.

21. The non-transitory server-readable storage medium of claim 17, wherein the stored server-executable instructions are configured to cause the server computing device to perform operations further comprising:
- determining from the authentication answer message whether the called party correctly answered the authentication challenge but does not accept the communication;
- transmitting, to the selected third-party computing device, complete presentation information related to the unanswered call request that indicates at least an identification of the calling party in response to determining that the called party correctly answered the authentication challenge but does not accept the communication; and
- determining whether a message is received from the selected third-party computing device that accepts the communication after transmission of the complete presentation information related to the unanswered call request,
- wherein administering the communication between the calling party computing device and the selected third-party computing device in response to determining that the called party correctly answered the authentication challenge comprises administering the communication between the calling party computing device and the selected third-party computing device in response to determining the called party has correctly answered the authentication challenge and that the message is received that accepts the communication.

22. The non-transitory server-readable storage medium of claim 17, wherein the stored server-executable instructions are configured to cause the server computing device to perform operations further comprising:
- transmitting to the calling party computing device a representation of the ordered list of potential third-party computing devices;
- receiving, from the calling party computing device, an approval response message in response to transmitting the representation; and
- revising the ordered list of potential third-party computing devices based on the received approval response message by at least one of reordering the ordered list of potential third-party computing devices and removing items from the ordered list of potential third-party computing devices, and
- wherein selecting the third-party computing device from the ordered list of potential third-party computing devices comprises selecting the third-party computing device from the revised list of potential third-party computing devices.

23. The non-transitory server-readable storage medium of claim 17, wherein the stored server-executable instructions are configured to cause the server computing device to perform operations further comprising calculating at least one of billing information and crediting information based on the administered communication.

24. The non-transitory server-readable storage medium of claim 17, wherein the stored server-executable instructions are configured to cause the server computing device to perform operations further comprising:
- selecting another third-party computing device from the ordered list of potential third-party computing devices; and transmitting the call request notification to the selected another third-party computing device in response to determining that the call acceptance message was not received from the selected third-party computing device.

25. A communication system, comprising:

a telecommunication network;

a server computing device coupled to the telecommunications network; and a plurality of computing devices coupled to the telecommunications network including at least a calling party computing device associated with a calling party and a plurality of third-party computing devices, wherein the server computing device is configured with server-executable instructions to perform operations comprising:

obtaining, from the plurality of computing devices, current status data for storage within profiles of registered users of a communication service, the registered users including at least the calling party, a called party, and a plurality of third-parties;

determining whether the called party is unreachable based on an unanswered call request for a communication from the calling party computing device;

generating an ordered list of potential third-party computing devices associated with the plurality of third-parties and of the plurality of third-party computing devices based on the unanswered call request for the communication, the profiles of the registered users, and the obtained current status data in response to determining the called party is unreachable on his/her own device;

selecting a first third-party computing device from the ordered list of potential third-party computing devices;

transmitting a call request notification to the first third-party computing device;

determining whether a call acceptance message is received from the first third-party computing device;

transmitting an authentication challenge for the called party to answer to the first third-party computing device in response to receiving the call acceptance message from the first third-party computing device;

determining from an authentication answer message received from the first third-party computing device whether the called party correctly answered the transmitted authentication challenge; and administering the communication between the calling party computing device and the first third-party computing device via the telecommunication network in response to determining that the called party correctly answered the authentication challenge, and wherein the calling party computing device comprises a first processor configured with processor-executable instructions to perform operations comprising:

transmitting current status data related to the calling party computing device to the server computing device;

transmitting the unanswered call request for the communication with the called party to the server computing device; and participating in the communication with the first third-party computing device when the server computing device determines that the called party correctly answered the authentication challenge, and wherein the first third-party computing device comprises a second processor configured with processor-executable instructions to perform operations comprising:

transmitting current status data related to the first third-party computing device to the server computing device;

receiving the call request notification from the server computing device;

transmitting the call acceptance message to the server computing device;

receiving the authentication challenge for the called party in response to transmitting the call acceptance message from the server computing device;

receiving a first user input that indicates a challenge answer to the received authentication challenge;

transmitting the challenge answer in the authentication answer message with the answer to the received authentication challenge to the server computing device; and participating in the communication with the calling party computing device when the server computing device determines that the called party correctly answered the authentication challenge.

26. The communication system of claim 25, wherein the server computing device is configured with server-executable instructions to perform operations such that the obtained current status data includes at least one of computing device location information, scheduling information, and computing device registration information.

27. The communication system of claim 25, wherein the server computing device is configured with server-executable instructions to perform operations such that transmitting the call request notification to the first third-party computing device comprises generating, based on the unanswered call request and the profiles of the registered users, the call request notification with presentation information that includes at least an identification of the called party.

28. The communication system of claim 25, wherein the server computing device is configured with server-executable instructions to perform operations such that the authentication challenge for the called party is a prompt for at least one of a personal identity number (PIN), a biometric fingerprint scan, a spoken keyword, an iris scan, and an NFC tap.

29. The communication system of claim 25, wherein the server computing device is configured with server-executable instructions to perform operations further comprising:

determining from the authentication answer message whether the called party correctly answered the authentication challenge but does not accept the communication;

transmitting, to the first third-party computing device, complete presentation information related to the unanswered call request that indicates at least an identification of the calling party in response to determining that the called party correctly answered the authentication challenge but does not accept the communication; and determining whether a message is received from the first third-party computing device that accepts the communication after transmission of the complete presentation information related to the unanswered call request, wherein administering the communication between the calling party computing device and the first third-party computing device via the telecommunication network in response to determining that the called party correctly answered the authentication challenge comprises administering the communication between the calling party computing device and the first third-party computing device via the telecommunication network in response to determining the called party has correctly answered the authentication challenge and that the message is received that accepts the communication, and wherein the second processor is configured with processor-executable instructions to perform operations further comprising:

receiving the complete presentation information related to the unanswered call request from the server computing device;

displaying the received complete presentation information;

receiving a second user input that indicates an acceptance of the communication in response to displaying the received complete presentation information; and transmitting the message that accepts the communication in response to receiving the second user input to the server computing device.

30. The communication system of claim 25, wherein the server computing device is configured with server-executable instructions to perform operations further comprising:

transmitting, a representation of the ordered list of potential third-party computing devices to the calling party computing device, wherein the ordered list includes at least the first third-party computing device;

receiving an approval response message in response to transmitting the representation from the calling party computing device; and revising the ordered list of potential third-party computing devices based on the received approval response message by at least one of reordering the ordered list of potential third-party computing devices and removing items from the ordered list of potential third-party computing devices, and wherein selecting the first third-party computing device from the ordered list of potential third-party computing devices comprises selecting the first third-party computing device from the revised list of potential third-party computing devices, and wherein the first processor is configured with processor-executable instructions to perform operations further comprising:

receiving the representation of the ordered list of potential third-party computing devices from the server computing device;

displaying the representation of the ordered list of potential third-party computing devices;

receiving a third user input approving of at least the first third-party computing device based on the displayed representation; and transmitting the approval response message in response to receiving the third user input to the server computing device.

* * * * *